(12) United States Patent
Hirose

(10) Patent No.: US 8,285,301 B2
(45) Date of Patent: Oct. 9, 2012

(54) COMMUNICATION TERMINAL, METHOD FOR ALLOWING COMMUNICATION TERMINAL TO OBTAIN POSITION INFORMATION, AND PROGRAM PRODUCT FOR CONTROLLING COMMUNICATION TERMINAL

(75) Inventor: Yuhji Hirose, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 769 days.

(21) Appl. No.: 12/373,033

(22) PCT Filed: Jun. 18, 2007

(86) PCT No.: PCT/JP2007/062201
§ 371 (c)(1),
(2), (4) Date: Jul. 1, 2009

(87) PCT Pub. No.: WO2008/007518
PCT Pub. Date: Jan. 17, 2008

(65) Prior Publication Data
US 2010/0015996 A1 Jan. 21, 2010

(30) Foreign Application Priority Data
Jul. 11, 2006 (JP) .................................. 2006-190308

(51) Int. Cl.
*H04W 24/00* (2009.01)
(52) U.S. Cl. .................. 455/456.1; 455/457; 455/404.2; 455/41.2; 455/456.2; 455/456.3; 455/456.4; 455/456.5; 455/456.6; 340/10.1; 340/10.3; 340/10.42; 340/426.22; 340/426.2
(58) Field of Classification Search ....... 455/456.1–457, 455/404.2, 41.2; 340/10.1, 10.3, 10.42, 426.22, 340/426.2
See application file for complete search history.

(56) References Cited

U.S. PATENT DOCUMENTS
7,155,238 B2 * 12/2006 Katz .......................... 455/456.1
(Continued)

FOREIGN PATENT DOCUMENTS
JP 10-148536 A 6/1998
(Continued)

OTHER PUBLICATIONS
European Search report for corresponding application No. 07745451.0, dated Dec. 14, 2011.

*Primary Examiner* — Ajit Patel
*Assistant Examiner* — Yousef Rod
(74) *Attorney, Agent, or Firm* — Birch, Stewart, Kolasch & Birch, LLP

(57) ABSTRACT

A communication terminal capable of obtaining assist data without making a configuration of an information providing device for transmitting the assist data complicated is provided. Processing performed by a communication terminal includes the steps of: storing an obtained identifier in a buffer area for a base station for which assist data should be obtained and a buffer area for a standby base station; obtaining an identifier of a wireless base station from a received signal and storing the identifier in a RAM; storing an identifier of a wireless base station after change in the buffer area for a standby base station; and storing the identifier stored in the buffer area for a standby base station in the buffer area for a base station for which assist data should be obtained when the identifier stored in the buffer area for a standby base station is not stored in the buffer area for a base station for which assist data should be obtained.

20 Claims, 18 Drawing Sheets

U.S. PATENT DOCUMENTS

| | | |
|---|---|---|
| 2001/0009407 A1 | 7/2001 | Honda et al. |
| 2007/0109186 A1 | 5/2007 | Fujiwara et al. |

FOREIGN PATENT DOCUMENTS

| | | |
|---|---|---|
| JP | 11-088213 A | 3/1999 |
| JP | 2001-74826 A | 3/2001 |
| JP | 2001-211472 A | 8/2001 |
| JP | 2004-147217 A | 5/2004 |
| JP | 2004-153721 A | 5/2004 |
| JP | 2005-86629 A | 3/2005 |
| JP | 2006-38732 A | 2/2006 |
| JP | 2006-58178 A | 3/2006 |
| WO | WO-2006/006463 A1 | 1/2006 |
| WO | WO 2006/006530 A1 | 1/2006 |

* cited by examiner

COMMUNICATION TERMINAL, METHOD FOR ALLOWING COMMUNICATION TERMINAL TO OBTAIN POSITION INFORMATION, AND PROGRAM PRODUCT FOR CONTROLLING COMMUNICATION TERMINAL

TECHNICAL FIELD

The present invention relates to a communication terminal, and more particularly to a communication terminal having a positioning function and a program product for controlling the terminal.

BACKGROUND ART

There has been known an information providing device for transmitting information for assisting positioning (hereinafter referred to as "assist data") to a communication terminal having a positioning function when the communication terminal is present at a boundary between a range in which a wireless base station can provide communication service (hereinafter referred to as a "cover range") and a range other than the cover range (for example, Japanese Patent Laying-Open No. 2006-038732 (Patent Document 1)).

Patent Document 1: Japanese Patent Laying-Open No. 2006-038732

DISCLOSURE OF THE INVENTION

Problems to be Solved by the Invention

However, an information providing device as disclosed in Japanese Patent Laying-Open No. 2006-038732 cannot transmit assist data to a communication terminal unless it perceives the timing when the communication terminal moves out of a cover range, and thus the information providing device requires a configuration for perceiving the timing. Therefore, there has been a possibility that a configuration of the information providing device, or a communication control structure in a communication line connecting the communication terminal and the information providing device becomes complicated.

The present invention has been made to solve the problem as described above, and one object of the present invention is to provide a communication terminal capable of obtaining assist data without making a configuration of an information providing device for transmitting the assist data complicated.

Another object of the present invention is to provide a method for allowing a communication terminal to obtain position information without making a configuration of an information providing device for transmitting assist data complicated.

Still another object of the present invention is to provide a program product for controlling a communication terminal to obtain assist data without making a configuration of an information providing device for transmitting the assist data complicated.

Means for Solving the Problems

To solve the problem described above, according to an aspect of the present invention, a communication terminal capable of wirelessly communicating with each of a plurality of base stations is provided. Each base station is connected to an information providing device via a communication line. The information providing device is capable of transmitting assist data for assisting to specify a position of the communication terminal in response to a request. Each base station is capable of transmitting a radio wave including identification information for identifying itself and a radio wave including the assist data. The communication terminal includes: a first reception unit receiving each radio wave transmitted by each base station; a first obtaining unit obtaining the identification information from the radio wave, a storage unit storing the identification information obtained by the first obtaining unit; a second obtaining unit obtaining the assist data from the information providing device when the communication terminal is present in a range in which the communication terminal can communicate with the base station specified by the identification information; a second reception unit receiving a plurality of positioning signals for positioning; a calculation unit calculating position information indicating the position of the communication terminal based on the assist data or the plurality of positioning signals; and an output unit outputting the position information calculated by the calculation unit.

Preferably, the second obtaining unit compares the identification information newly obtained by the first obtaining unit with the identification information already stored in the storage unit, and thereby determines whether or not the communication terminal is present in the range, generates a transmission request for the assist data when it is determined that the communication terminal is present in the range, transmits the generated transmission request to the information providing device, and extracts the assist data from a signal received by the first reception unit.

Preferably, the storage unit sequentially stores, of the identification information obtained by the first obtaining unit, the identification information different from the already stored identification information. The communication terminal further includes a detection unit detecting that the communication terminal has moved from a range in which the communication terminal cannot receive the radio waves transmitted by the base stations to a range in which the communication terminal can communicate with the base station specified by the identification information most recently stored in the storage unit, based on an output from the first reception unit. The second obtaining unit obtains the assist data when the communication terminal is present again in the range in which the communication terminal can communicate with the base station specified by the most recently stored identification information.

Preferably, when the communication terminal moves from a first range in which the communication terminal cannot receive the radio waves transmitted by the base stations to a second range in which the communication terminal can receive the radio waves, the first obtaining unit obtains the identification information from the radio waves received in the second range. When the communication terminal moves to the first range after the first obtaining unit obtains the identification information, and then moves from the first range to be present again in the second range in which the communication terminal can receive the radio wave from the base station specified by the identification information, the second obtaining unit obtains the assist data based on the identification information.

Preferably, the communication terminal further includes a time keeping unit keeping time. The second obtaining unit obtains the assist data at predetermined time intervals.

Preferably, the communication terminal further includes an input unit accepting a manipulation for the communication terminal. The first obtaining unit obtains the identification information based on an input of a manipulation predefined as a manipulation for obtaining the identification information.

Preferably, the communication terminal further includes a confirmation unit confirming whether or not each positioning signal has been received by the second reception unit based on an output from the second reception unit. When it is confirmed that each positioning signal has not been received, the calculation unit calculates the position information based on the assist data.

Preferably, the communication terminal further includes a confirmation unit confirming whether or not each positioning signal has been received by the second reception unit based on an output from the second reception unit. When it is confirmed that each positioning signal has been received, the calculation unit calculates the position information based on each positioning signal received.

Preferably, the assist data includes information specifying a location where the base station is placed.

Preferably, the identification information includes an identifier specific to the base station.

According to another aspect of the present invention, a method for allowing a communication terminal to obtain position information is provided. The communication terminal is capable of wirelessly communicating with each of a plurality of base stations. Each base station is connected to an information providing device via a communication line. The information providing device is capable of transmitting assist data for assisting to specify a position of the communication terminal in response to a request. Each base station is capable of transmitting a radio wave including identification information for identifying itself and a radio wave including the assist data. The method includes the steps of receiving each radio wave transmitted by each base station; obtaining the identification information from the radio wave; storing the obtained identification information; obtaining the assist data from the information providing device when the communication terminal is present in a range in which the communication terminal can communicate with the base station specified by the identification information; receiving a plurality of positioning signals for positioning; calculating position information indicating the position of the communication terminal based on the assist data or the plurality of positioning signals; and outputting the calculated position information.

Preferably, the step of obtaining the assist data compares the identification information newly obtained with the identification information already stored, and thereby determines whether or not the communication terminal is present in the range, generates a transmission request for the assist data when it is determined that the communication terminal is present in the range, transmits the generated transmission request to the information providing device, and extracts the assist data from a received signal.

Preferably, the step of storing the identification information sequentially stores, of the obtained identification information, the identification information different from the already stored identification information. The method further includes the step of detecting that the communication terminal has moved from a range in which the communication terminal cannot receive the radio waves transmitted by the base stations to a range in which the communication terminal can communicate with the base station specified by the identification information most recently stored. The step of obtaining the assist data obtains the assist data when the communication terminal is present again in the range in which the communication terminal can communicate with the base station specified by the most recently stored identification information.

Preferably, when the communication terminal moves from a first range in which the communication terminal cannot receive the radio waves transmitted by the base stations to a second range in which the communication terminal can receive the radio waves, the step of obtaining the identification information obtains the identification information from the radio waves received in the second range. When the communication terminal moves to the first range after the identification information is obtained, and then moves from the first range to be present again in the second range in which the communication terminal can receive the radio wave from the base station specified by the identification information, the step of obtaining the assist data obtains the assist data based on the identification information.

Preferably, the method further includes the step of keeping time. The step of obtaining the assist data obtains the assist data at predetermined time intervals.

Preferably, the method further includes the step of accepting a manipulation for the communication terminal. The step of obtaining the identification information obtains the identification information based on an input of a manipulation predefined as a manipulation for obtaining the identification information.

Preferably, the method further includes the step of confirming whether or not each positioning signal has been received. When it is confirmed that each positioning signal has not been received, the step of calculating the position information calculates the position information based on the assist data.

Preferably, the method further includes the step of confirming whether or not each positioning signal has been received. When it is confirmed that each positioning signal has been received, the step of calculating the position information calculates the position information based on each positioning signal received.

According to still another aspect of the present invention, a program product for controlling a communication terminal is provided. The communication terminal is capable of wirelessly communicating with each of a plurality of base stations. Each base station is connected to an information providing device via a communication line. The information providing device is capable of transmitting assist data for assisting to specify a position of the communication terminal in response to a request. Each base station is capable of transmitting a radio wave including identification information for identifying itself and a radio wave including the assist data. The program product causes the communication terminal to perform the steps of: receiving each radio wave transmitted by each base station; obtaining the identification information from the radio wave; saving the obtained identification information; obtaining the assist data from the information providing device when the communication terminal is present in a range in which the communication terminal can communicate with the base station specified by the identification information, receiving a plurality of positioning signals for positioning; obtaining position information indicating the position of the communication terminal based on the assist data or the plurality of positioning signals; and outputting the obtained position information.

Effects of the Invention

According to one aspect of the present invention, a communication terminal capable of obtaining assist data without making a configuration of an information providing device for transmitting the assist data complicated is provided.

According to another aspect of the present invention, a method for allowing a communication terminal to obtain position information without making a configuration of an information providing device for transmitting assist data complicated is provided.

According to still another aspect of the present invention, a program product for controlling a communication terminal to obtain assist data without making a configuration of an information providing device for transmitting the assist data complicated is provided.

DESCRIPTION OF THE REFERENCE SIGNS

100: communication terminal, 102: communication line, 130: GPS satellite, 120: Internet line, 202, 212: antenna unit, 302, 306, 1110, 1170: antenna, 382: memory card, 410 to 480, 1510 to 1570: area, 1100, 1800a to 1800j: wireless base station, 1462: CD-ROM, 1470: data bus, 1700: signal, 1810a to 1810j: cover range, 1820-1 to 1820-5 P(1) to P(15): point.

BEST MODES FOR CARRYING OUT THE INVENTION

Hereinafter, an embodiment of the present invention will be described with reference to the drawings. In the description below, identical parts are denoted by the same numerals. Since they are identical in name and function, detailed description thereof will not be repeated.

Figure 1:
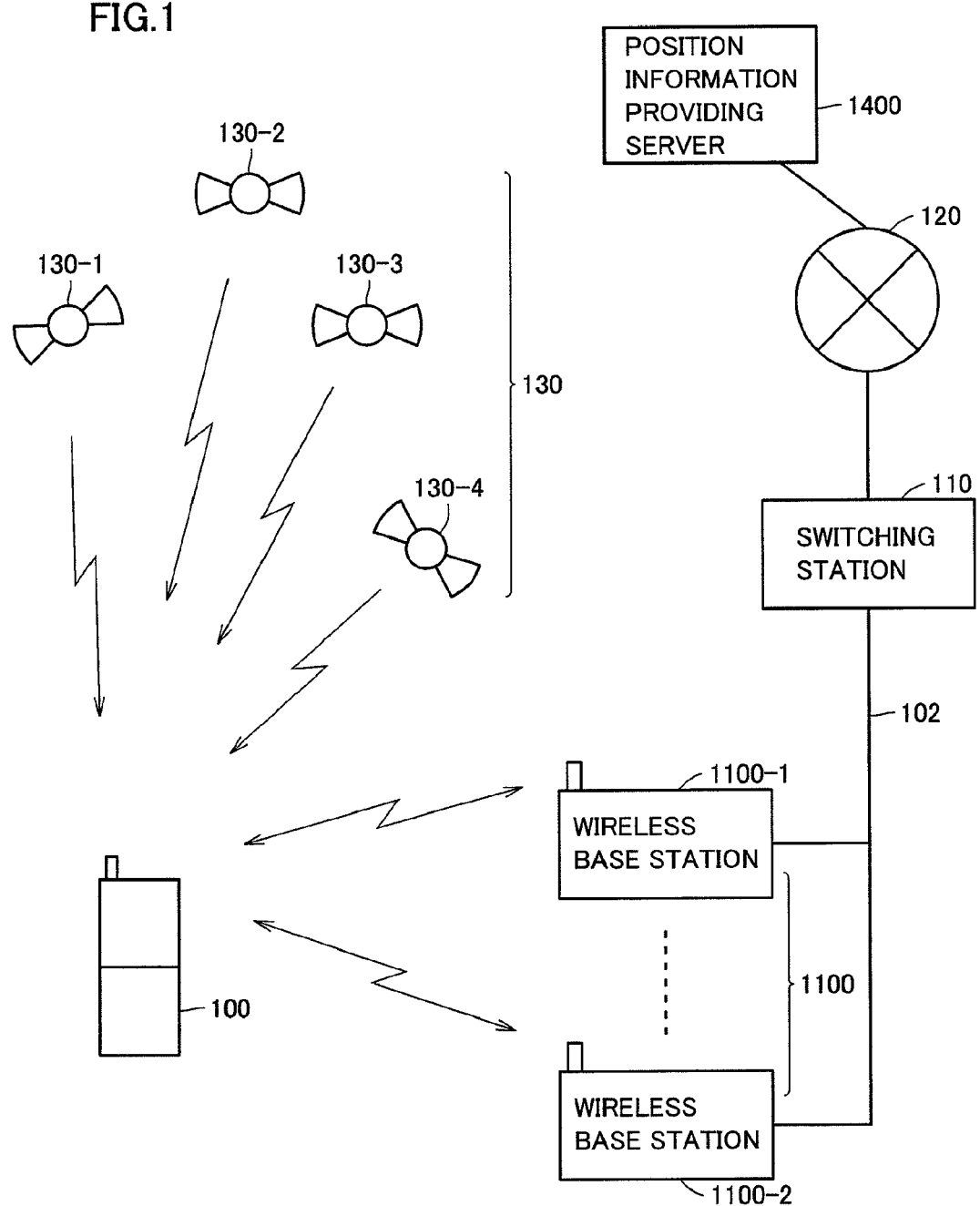
FIG. 1 is a schematic view of a communication network in which a communication terminal 100 in accordance with an embodiment of the present invention is included.

Referring to FIG. 1, a manner of using a communication terminal 100 in accordance with an embodiment of the present invention will be described. FIG. 1 is a schematic view of a communication network in which communication terminal 100 is included. Communication terminal 100 is implemented, for example, as a mobile phone.

Communication terminal 100 communicates with one of a plurality of wireless base stations (for example, wireless base stations 1100-1, 1100-2). Hereinafter, when the wireless base stations are generically denoted, they will be referred to as wireless base stations 1100. Each wireless base station 1100 is connected to a switching station 110 via a communication line 102. Switching station 110 is connected to a position information providing server 1400 via an Internet line 120. Communication terminal 100 receives signals transmitted by a plurality of GPS (Global Positioning System) satellites 130. Although the GPS satellites are illustrated as satellites transmitting signals for positioning, other satellite navigation systems (for example, Galileo in Europe, and GLONASS (Global Navigation Satellite System) in Republic of Russia) may be used.

Communication terminal 100 performs call transmission/reception to/from or data communication with wireless base station 1100. Wireless base station 1100 relays communication between communication terminal 100 and another communication device (for example, a fixed-line phone). Switching station 110 relays communication between wireless base station 1100 and another information processing device (for example, position information providing server 1400), and when there is a difference in protocols between communication schemes, switching station 110 implements the relay by performing protocol conversion. Position information providing server 1400 transmits information for specifying a position of communication terminal 100 in response to a transmission request sent from communication terminal 100. This information corresponds to, for example, information indicating a location of wireless base station 1100 that is present in a range in which communication terminal 100 can communicate.

Figure 2:
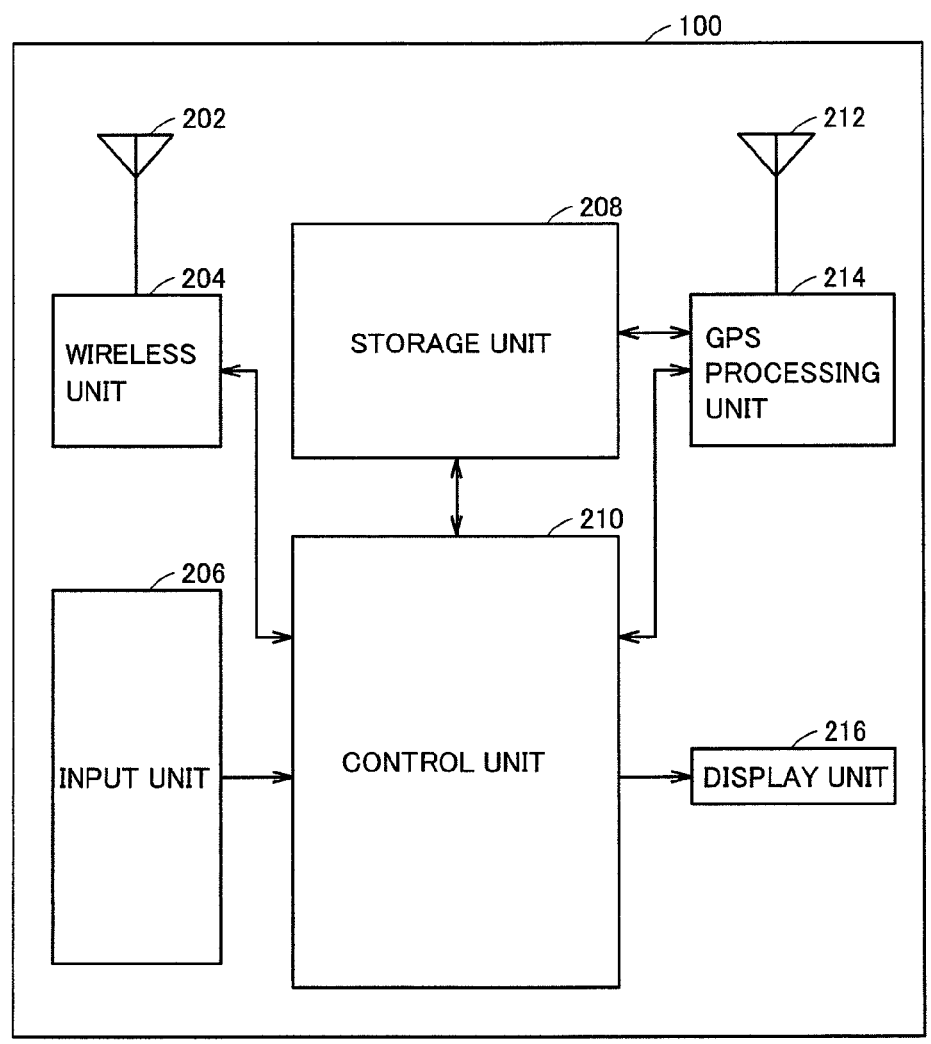
FIG. 2 is a block diagram showing a functional configuration of communication terminal 100.

Referring to FIG. 2, main functions of communication terminal 100 in accordance with the present embodiment will be described. FIG. 2 is a block diagram showing a functional configuration of communication terminal 100. Communication terminal 100 includes antenna units 202 and 212, a wireless unit 204, an input unit 206, a storage unit 208, a control unit 210, a GPS processing unit 214, and a display unit 216.

Antenna unit 202 receives a radio wave transmitted by wireless base station 1100, or antenna unit 202 transmits a signal output from wireless unit 204.

Wireless unit 204 is supplied with a signal received by antenna unit 202. Wireless unit 204 performs front-end processing or frequency conversion processing on the signal, and sends the signal to control unit 210. Wireless unit 204 converts a signal output from control unit 210 into a format required for transmission, and sends the signal to antenna unit 202. Wireless communication of communication terminal 100 is implemented by the processing by wireless unit 204.

Input unit 206 accepts an input of a manipulation for communication terminal 100. Input unit 206 is implemented, for example, with numeric buttons, touch panel type buttons, a jog dial, or the like.

Storage unit 208 stores data necessary for causing communication terminal 100 to perform a predefined operation. Storage unit 208 also stores data included in a signal received by wireless unit 204. Or, storage unit 208 stores information obtained by GPS processing unit 214. Storage unit 208 is implemented with a nonvolatile memory.

Control unit 210 controls the operation of communication terminal 100 in accordance with the manipulation on input unit 206. When communication terminal 100 is, for example, in a state where it can communicate with wireless base station 1100 (i.e., in a so-called standby state), control unit 210 detects presence or absence of an incoming call in accordance with an output from wireless unit 204. Or, when a user of communication terminal 100 tries to make a call, control unit 210 generates a signal necessary for making a call in accordance with the manipulation on input unit 206, and sends the signal to wireless unit 204.

Antenna unit 212 receives signals transmitted by GPS satellites 130. The signals transmitted from satellites 130 are transmitted, for example, by the spread spectrum scheme. Accordingly, the signals transmitted at the same frequency are received by antenna unit 212 without interference.

GPS processing unit 214 performs processing for calculating pseudo ranges between communication terminal 100 and GPS satellites 130, on the signals received by antenna unit 212. GPS processing unit 214 generates replica codes using codes each defined for each GPS satellite 130, finds a replica code that matches a signal received by antenna unit 212, and specifies GPS satellite 130 that has transmitted the signal.

A signal output from GPS processing unit 214 is input to control unit 210. Control unit 210 calculates a distance between communication terminal 100 and GPS satellite 130 based on the signals, and calculates information indicating a position of communication terminal 100 (for example, latitude, longitude, and the like).

Display unit 216 displays an image corresponding to the data stored in storage unit 208. Display unit 216 displays, for example, the name and the phone number of a person on the other end of communication terminal 100, or the information indicating the position of communication terminal 100 specified by GPS processing unit 214 (for example, latitude, longitude, or a map showing the vicinity of the position).

Figure 3:
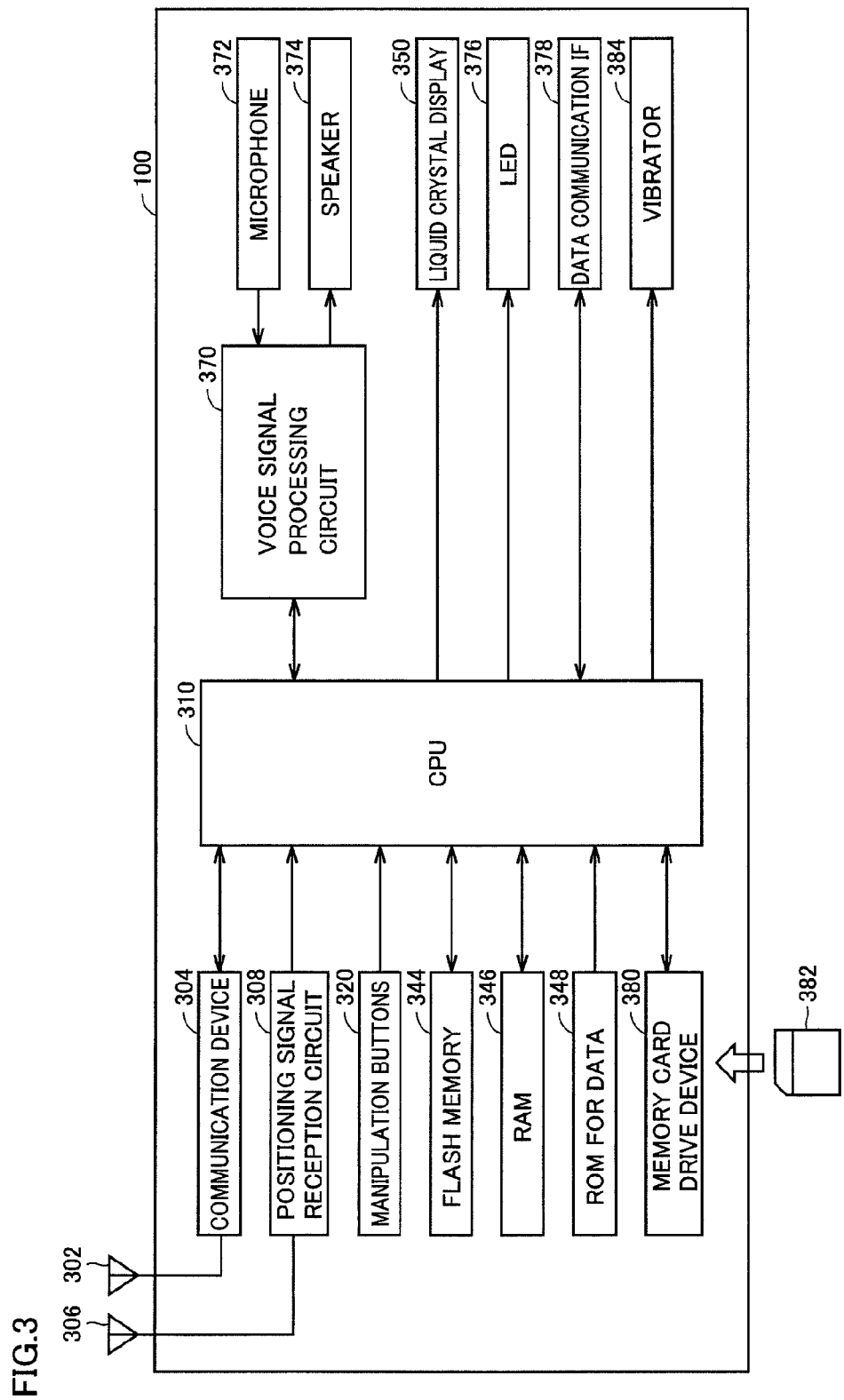
FIG. 3 is a block diagram showing a hardware configuration of communication terminal 100.

Referring to FIG. 3, a concrete configuration of communication terminal 100 in accordance with the present embodiment will be described. FIG. 3 is a block diagram showing a hardware configuration of communication terminal 100. Communication terminal 100 includes antennas 302 and 306, a communication device 304, a positioning signal reception circuit 308, manipulation buttons 320, a flash memory 344, a RAM (Random Access Memory) 346, a ROM (Read Only Memory) 348 for data, a memory card drive device 380, a CPU (Central Processing Unit) 310, a voice signal processing circuit 370, a microphone 372, a speaker 374, a liquid crystal display 350, an LED (Light Emitting Diode) 376, a data communication IF (Interface) 378, and a vibrator 384. A memory card 382 is loaded in memory card drive device 380.

Antenna 302 receives a radio wave transmitted by wireless base station 1100. The radio wave includes a radio wave for wireless telephony and a radio wave for data communication. Antenna 302 sends a signal corresponding to the received radio wave to communication device 304. Communication device 304 performs A/D (Analog to Digital) conversion processing and other processing on the signal to convert the signal into a format required for processing within communication terminal 100. A digital signal output from communication device 304 is sent to CPU 310.

On the other hand, a digital signal output by CPU 310 is input to communication device 304. Communication device 304 performs modulation required for communication on the signal, and sends the modulated signal to antenna 302. Antenna 302 wirelessly transmits the signal.

Antenna 306 receives a signal transmitted from GPS satellite 130. The signal is sent to positioning signal reception circuit 308. Positioning signal reception circuit 308 performs amplification, frequency conversion, and other processing on the signal, to specify a transmission source of the signal. Positioning signal reception circuit 308 is implemented, for example, as a plurality of parallel correlator circuits. Data output from positioning signal reception circuit 308 is input to CPU 310.

Manipulation buttons 320 accept a manipulation for communication terminal 100. Manipulation buttons 320 are implemented, for example, as ten keys, arrow keys, and other buttons. A signal in response to depression of each button is input to CPU 310.

Flash memory 344 stores data generated by CPU 310. For example, in accordance with an instruction to save data input via manipulation buttons 320, flash memory 344 stores the instructed data.

RAM 346 temporarily stores data generated by CPU 310. The temporarily stored data includes data generated during positioning processing described later, and the like.

ROM 348 for data stores a program prepared for causing communication terminal 100 to perform a predetermined operation. The program includes an operating system for controlling basic operations of communication terminal 100, a communication control program required for data communication, a position information calculation program required for positioning, or the like.

Memory card drive device 380 performs data write/read into/from memory card 382 installed in the device based on an instruction from CPU 310. Data written by memory card drive device 380 includes, for example, data indicating the position of communication terminal 100 calculated by positioning signal reception circuit 308, call history of communication terminal 100, and the like.

CPU 310 controls the operation of communication terminal 100 in accordance with the manipulation on manipulation buttons 320. When a phone number and an instruction to make a call are input on manipulation buttons 320, CPU 310 performs processing for making a call to the number, and starts processing for a call via communication device 304. When a manipulation for measuring the position of communication terminal 100 is input on manipulation buttons 320, CPU 310 performs processing for deriving a present location of communication terminal 100 based on a signal obtained by positioning signal reception circuit 308. When communication device 304 receives an incoming call, and a manipulation for responding to the incoming call is performed on manipulation buttons 320, CPU 310 sends a signal thereof to voice signal processing circuit 370 to start a call.

Voice signal processing circuit 370 converts the signal output from CPU 310 into a signal in a format required for a call. Voice signal processing circuit 370 sends the converted signal to speaker 374. Speaker 374 outputs voice corresponding to the signal. On the other hand, when the user speaks to microphone 372, microphone 372 sends an electric signal corresponding to the user's voice to voice signal processing circuit 370. Voice signal processing circuit 370 performs digital conversion processing on the signal, and sends it to CPU 310.

Liquid crystal display 350 displays an image based on the data stored in flash memory 344, RAM 346, ROM 348 for data, or memory card 382. LED 376 performs an operation of emitting light in a predefined color based on a signal output from CPU 310. For example, when communication terminal 100 receives an incoming call, an operation of emitting light in a color preset for notifying the user of the incoming call is performed.

A cable for data communication can be connected to data communication IF 378. Data communication IF 378 outputs data output from CPU 310 to the connected cable. Conversely, data communication IF 378 receives data transmitted via the cable, and sends the data to CPU 310.

Vibrator 384 vibrates at a predefined frequency based on a signal from CPU 310. For example, when communication terminal 100 receives an incoming call, vibrator 384 vibrates at a preset frequency to notify the user of the incoming call.

Figure 4:
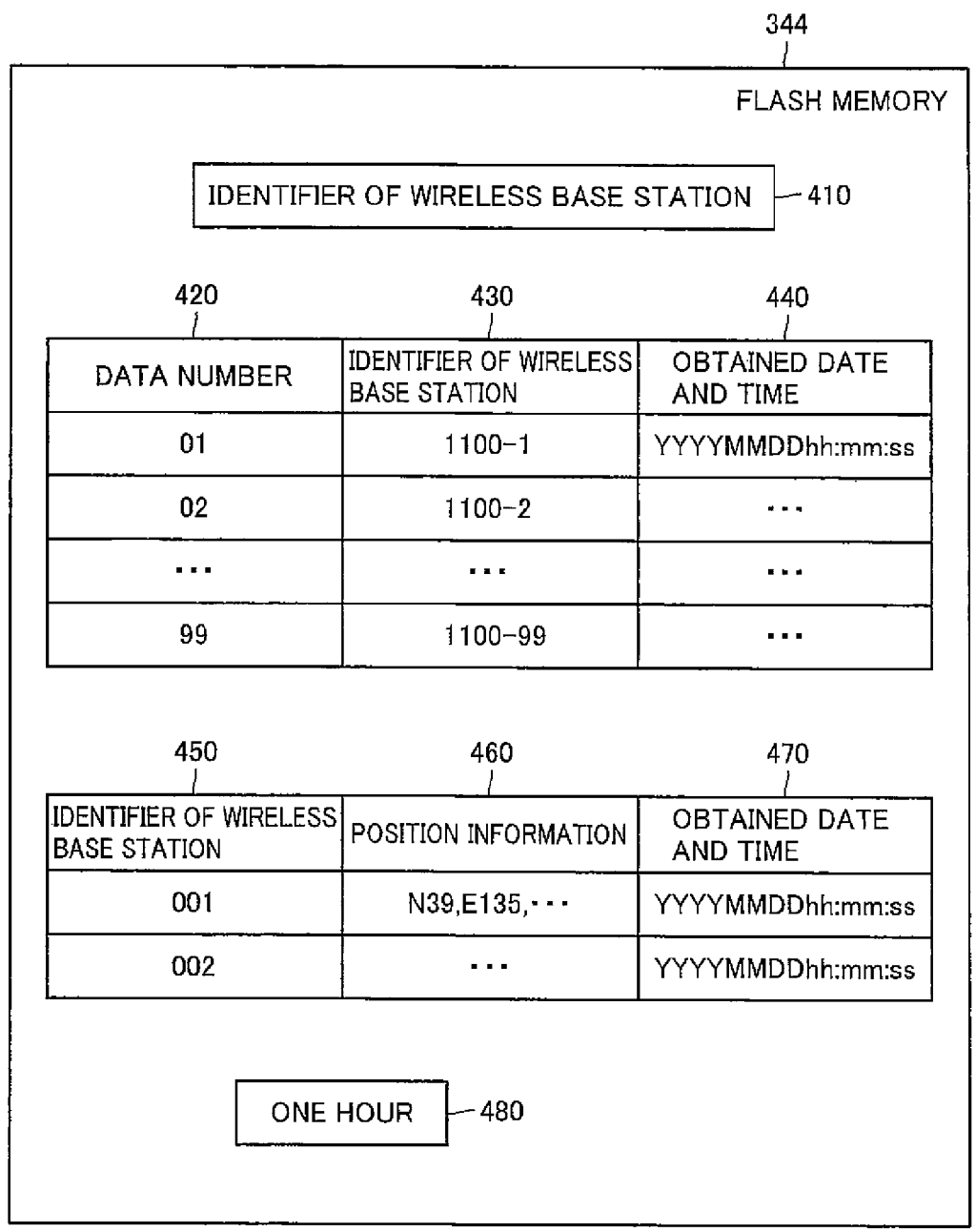
FIG. 4 is a view conceptually showing one manner of storing data in a flash memory 344.

Referring to FIG. 4, a data structure of communication terminal 100 in accordance with the present embodiment will be described. FIG. 4 is a view conceptually showing one manner of storing data in flash memory 344. Flash memory 344 includes areas 410 to 440 for storing data.

Area 410 stores data for identifying a wireless base station located in a range in which communication terminal 100 can communicate at present, as a buffer area for a standby base station. For example, when CPU 310 confirms based on a signal output from communication device 304 that communication terminal 100 can communicate with specific one of wireless base stations 1100, CPU 310 writes in area 410 an identifier assigned beforehand to the wireless base station.

Areas 420 to 440 are used as buffer areas for a base station for which assist data should be obtained. Specifically, identifiers of the wireless base stations are sequentially written when a condition described later is satisfied. Data specifying a record of an identifier of a wireless base station to be written is stored in area 420 as a data number. The identifier obtained on that occasion is stored in area 430. Data indicating the date and time when the identifier has been obtained is stored in area 440. Data stored in the buffer areas for a base station for which assist data should be obtained are sequentially stored whenever the condition is satisfied. While up to 99 records, for example, can be stored in the example shown in FIG. 4, the number of records to be stored is not limited to this number.

Figure 5:
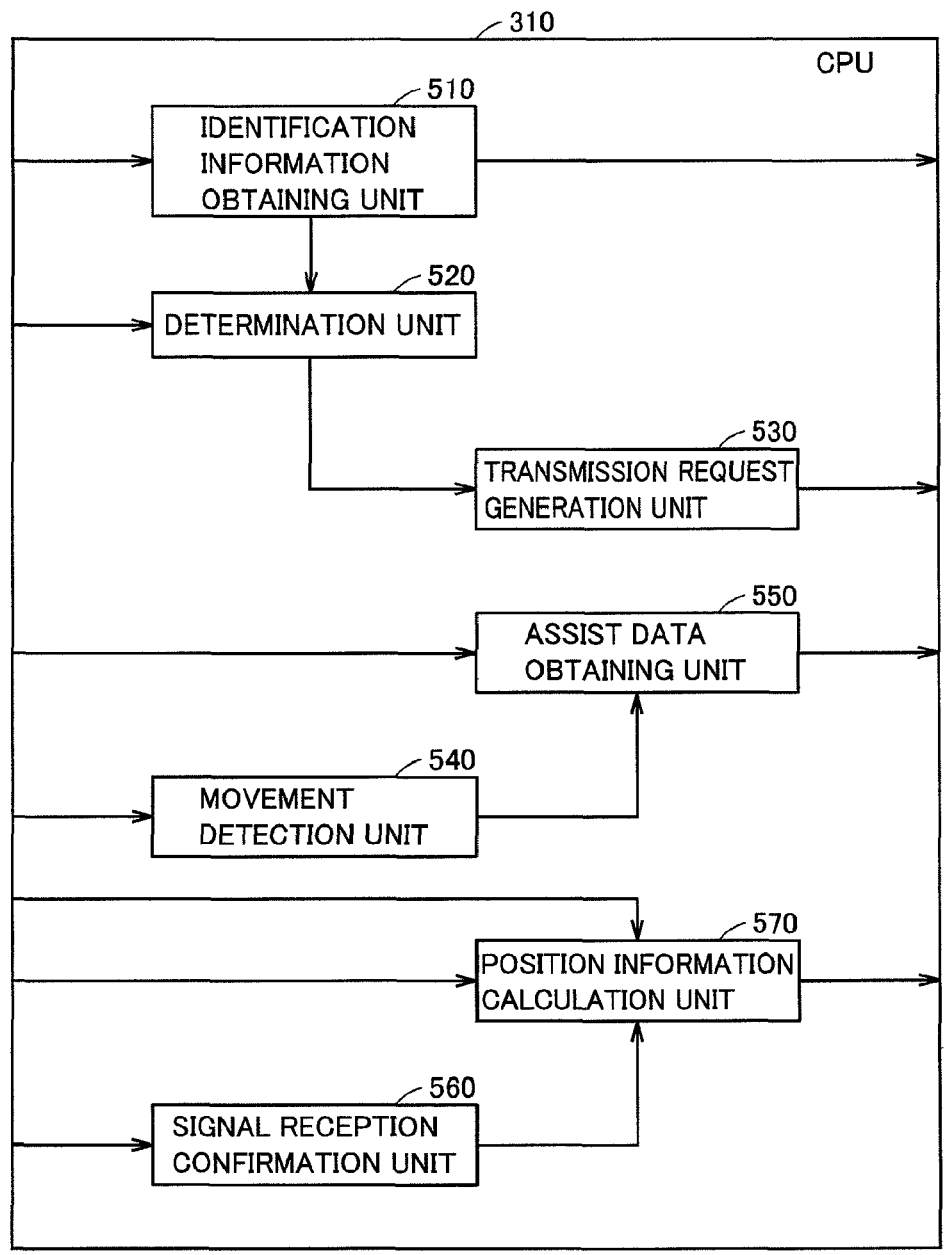
FIG. 5 is a block diagram showing a configuration of functions implemented by a CPU 310 of communication terminal 100.

Referring to FIG. 5, CPU 310 for implementing communication terminal 100 will be described. FIG. 5 is a block diagram showing a configuration of functions implemented by CPU 310. CPU 310 includes an identification information obtaining unit 510, a determination unit 520, a transmission request generation unit 530, a movement detection unit 540, an assist data obtaining unit 550, a signal reception confirmation unit 560, and a position information calculation unit 570. Each function is implemented when the program stored in ROM 348 for data is run.

Identification information obtaining unit 510 obtains, from a signal received by communication device 304, identification information (i.e., the identifier in FIG. 4) included in the signal. Identification information obtaining unit 510 writes the obtained identification information in flash memory 344. Preferably, identification information obtaining unit 510 obtains identification information of a wireless base station based on an instruction to obtain the identification information input on manipulation buttons 320, and stores the obtained identification information in flash memory 344. Herein, identification information is an identifier communication specific to a wireless base station, as described above. The identifier may be a code or another name given to the wireless base station, information of a location where the wireless base station is placed (for example, latitude, longitude, altitude), or the like.

Determination unit 520 compares the identification information obtained by identification information obtaining unit 510 with identification information already stored in flash memory 344, and thereby determines whether communication terminal 100 is present in a range in which it can communicate with a wireless base station specified by the identification information. Specifically, when the identification information obtained by identification information obtaining unit 510 matches identification information already stored in flash memory 344, determination unit 520 determines that communication terminal 100 is present in the range.

Transmission request generation unit 530 generates a request to transmit assist data based on a result of the determination by determination unit 520. Herein, assist data refers to data for assisting to specify the position of communication terminal 100. The assist data is implemented, for example, as data indicating a location specific to each wireless base station.

When it is determined that communication terminal 100 is present in the range in which it can communicate with the wireless base station specified by the identification information, transmission request generation unit 530 generates a request to transmit assist data therefor. Transmission request generation unit 530 sends the generated transmission request to communication device 304. Communication device 304 converts the transmission request into a signal in a format for wireless communication, and transmits the transmission request via antenna 302.

Movement detection unit 540 detects movement of communication terminal 100 based on a signal output from communication device 304. Preferably, movement detection unit 540 detects that communication terminal 100 has moved from a range in which it cannot receive radio waves transmitted by the wireless base stations to a range in which it can receive the radio waves, based on the strength of a signal received by antenna 302. More preferably, movement detection unit 540 detects that communication terminal 100 has moved from a range in which it cannot receive the radio waves to a range in which it can communicate with a wireless base station specified by identification information stored most recently in flash memory 344.

Assist data obtaining unit 550 obtains the assist data described above from position information providing server 1400 with which communication terminal 100 communicates. Assist data obtaining unit 550 extracts the assist data included in a signal output from communication device 304. Preferably, when it is detected that communication terminal 100 is present again in the range in which it can communicate with the wireless base station specified by the most recently stored identification information, assist data obtaining unit 550 obtains the assist data.

Alternatively, in another aspect, when communication terminal 100 moves to a range in which it cannot receive the radio waves transmitted by the wireless base stations (hereinafter referred to as a first range) after the identification information is obtained, and then moves again from the first range to a second range in which it can receive the radio wave from the wireless base station specified by the identification information, assist data obtaining unit 550 obtains the assist data based on the identification information. In another aspect, assist data obtaining unit 550 obtains the assist data at predetermined time intervals (for example, once every hour, at a set time every day, or the like).

Signal reception confirmation unit 560 confirms whether or not positioning signals transmitted by GPS satellites 130 have been received by positioning signal reception circuit 308, based on an output from positioning signal reception circuit 308.

Position information calculation unit 570 derives information indicating the position of communication terminal 100 based on either the assist data obtained by assist data obtaining unit 550 or the positioning signals received by positioning signal reception circuit 308. Preferably, when it is confirmed by signal reception confirmation unit 560 that the positioning signals have not been received, position information calculation unit 570 calculates position information of communication terminal 100 based on assist data stored in flash memory 344. In another aspect, when it is confirmed by signal reception confirmation unit 560 that the positioning signals transmitted by GPS satellites 130 have been received, position information calculation unit 570 calculates the pseudo ranges between communication terminal 100 and GPS satellites 130 based on the positioning signals, and calculates position information of communication terminal 100.

Figure 6:
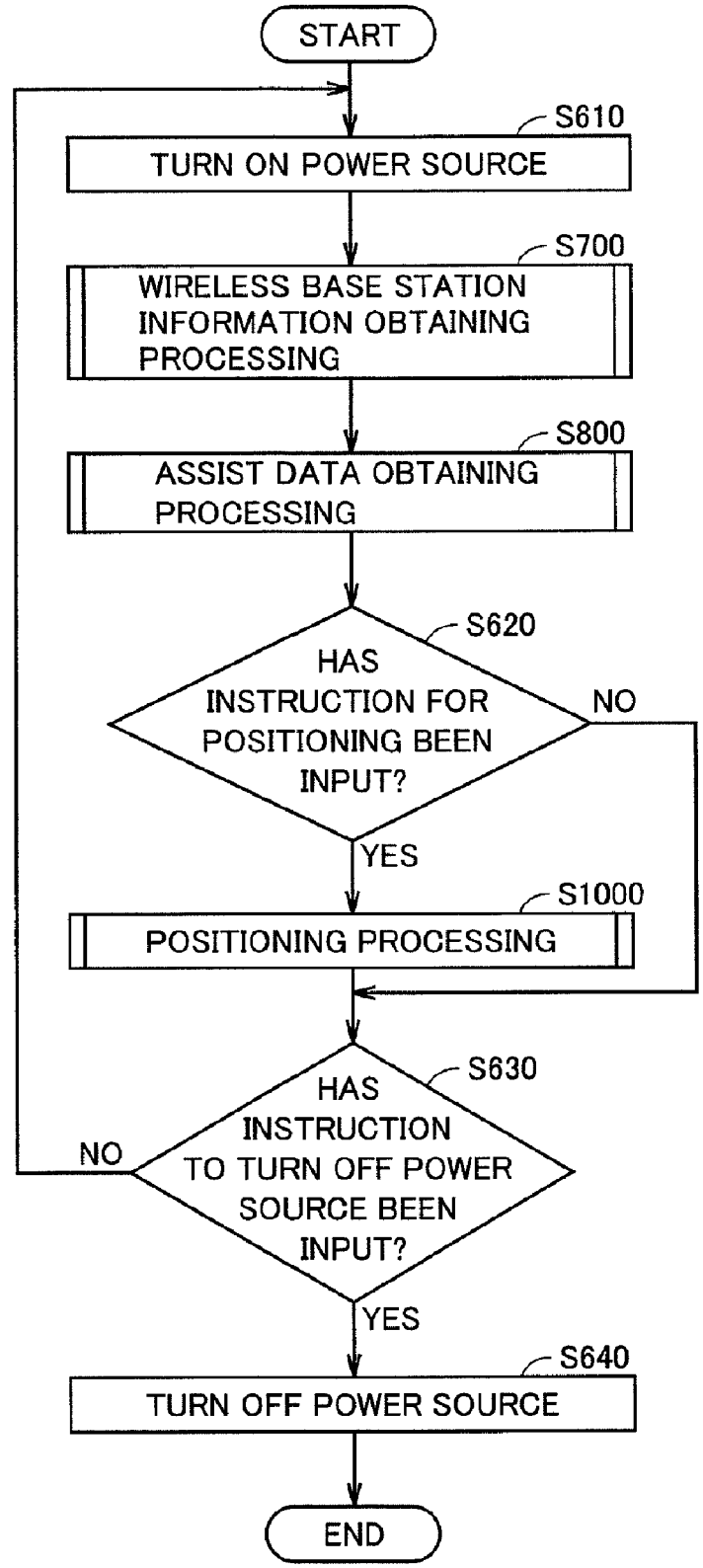
FIG. 6 is a flow chart (part 1) illustrating procedures of processing performed by CPU 310.
Figure 7:
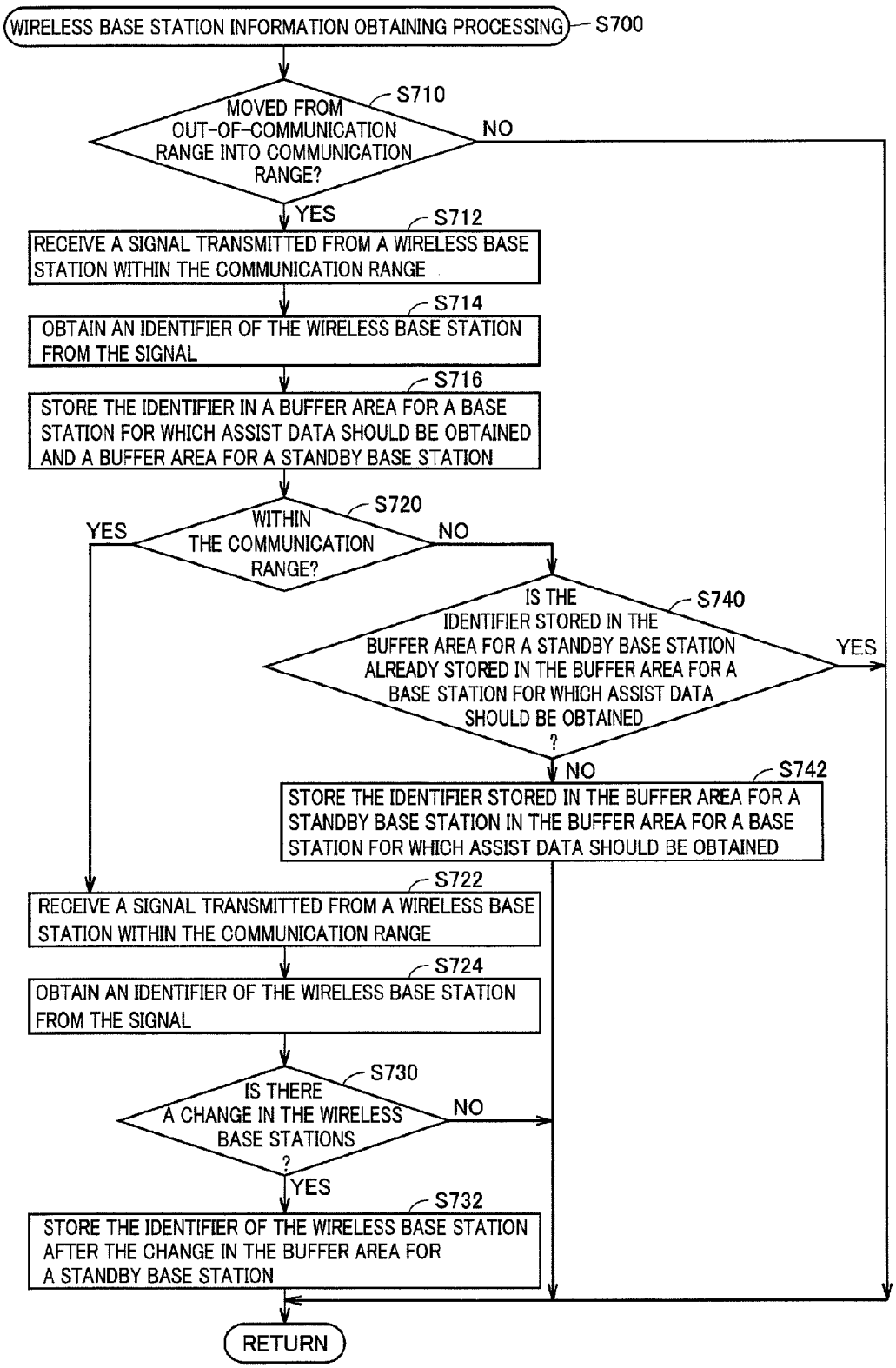
FIG. 7 is a flow chart (part 2) illustrating procedures of processing performed by CPU 310.
Figure 8:
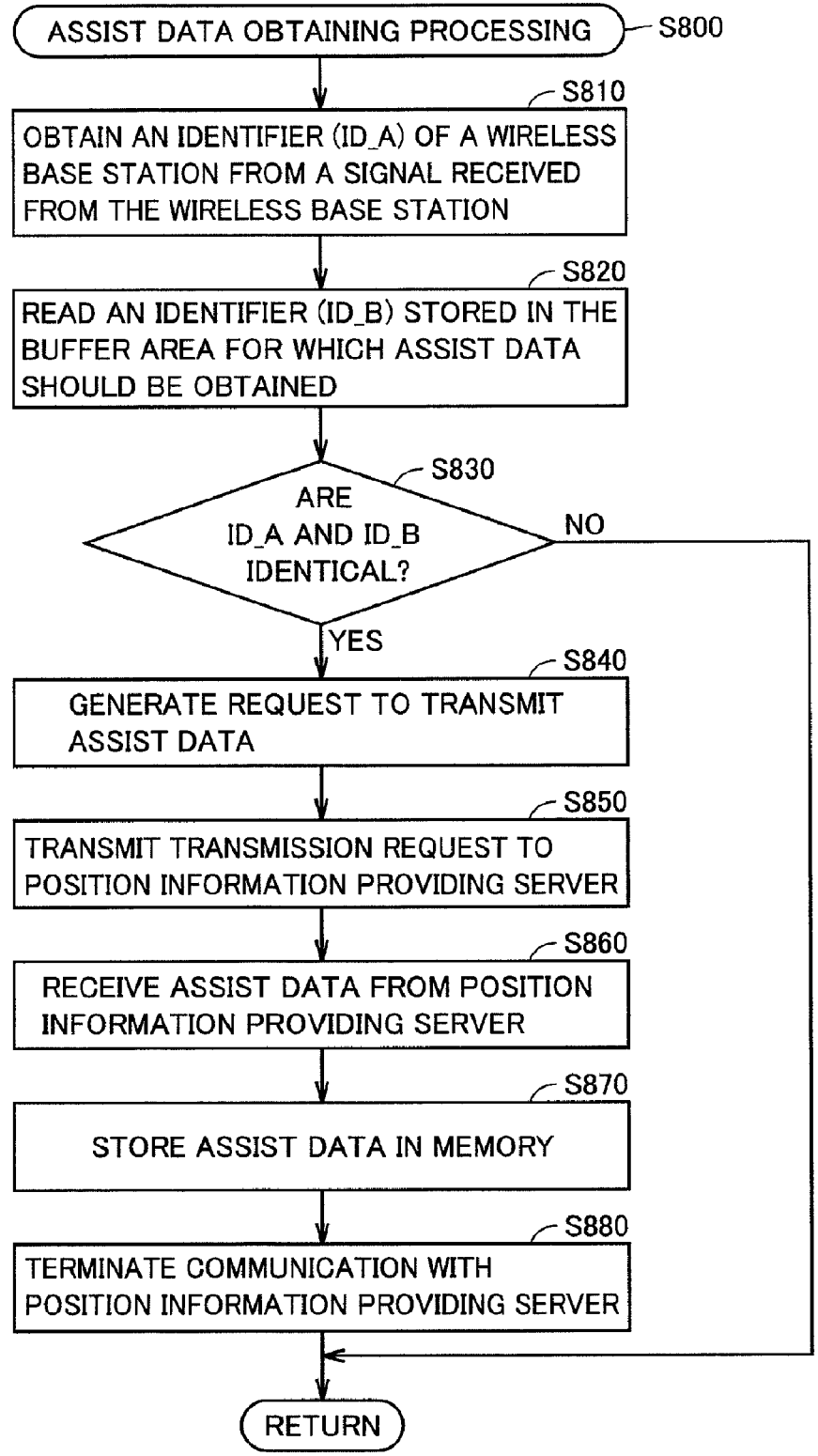
FIG. 8 is a flow chart (part 3) illustrating procedures of processing performed by CPU 310.

Referring to FIGS. 6 to 8, a control structure of communication terminal 100 will now be described. FIGS. 6 to 8 are each a flow chart illustrating procedures of processing performed by CPU 310.

Referring to FIG. 6, at step S610, CPU 310 turns on a power source for communication terminal 100 based on a manipulation on manipulation buttons 320. At step S700, CPU 310 performs wireless base station information obtaining processing (FIG. 7) described later. When this processing is performed, identification information (identifiers) of the wireless base stations is obtained and stored in flash memory 344. At step S800, CPU 310 performs assist data obtaining processing (FIG. 8) described later. When this processing is performed, assist data is obtained from position information providing server 1400.

At step S620, CPU 310 determines whether or not an instruction for positioning has been input based on a signal output from manipulation buttons 320. If CPU 310 determines that an instruction for positioning has been input (YES at step S620), the processing proceeds to step S1000. If not (NO at step S620), the processing proceeds to step S630.

At step S1000, CPU 310 performs positioning processing described later. When this processing is performed, the position of communication terminal 100 is specified and displayed on liquid crystal display 350.

At step S630, CPU 310 determines whether or not an instruction to turn off the power source of communication terminal 100 has been input based on a signal output from manipulation buttons 320. If CPU 310 determines that the instruction has been input (YES at step S630), the processing proceeds to step S640. If not (NO at step S630), the processing returns to step S700.

At step S640, CPU 310 gives an instruction to stop electric power supply from a battery (not shown) to each part. Thereafter, communication terminal 100 is shut down.

Referring to FIG. 7, at step S710, CPU 310 determines whether or not communication terminal 100 has moved into a communication range in which communication terminal 100 can communicate with a wireless base station, from an out-of-communication range in which communication terminal 100 cannot communicate with a wireless base station, based on an output from communication device 304. If CPU 310 determines that communication terminal 100 has moved into the communication range from the outside communication impossible range (YES at step S710), the processing proceeds to step S712. If not (NO at step S710), the processing is terminated.

At step S712, CPU 310 detects reception of a signal transmitted from a wireless base station within the communication range. At step S714, CPU 310 obtains an identifier of the wireless base station from the signal. At step S716, CPU 310 stores the obtained identifier in each of the buffer area for a base station for which assist data should be obtained (area 430) and the buffer area for a standby base station (area 410).

At step S720, CPU 310 determines whether or not communication terminal 100 is present within the communication range based on an output from communication device 304. If CPU 310 determines that communication terminal 100 is present within the communication range (YES at step S720), the processing proceeds to step S722. If not (NO at step S720), the processing proceeds to step S740.

At step S722, CPU 310 receives a signal transmitted from a wireless base station within the communication range via communication device 304. At step S724, CPU 310 obtains an identifier of the wireless base station from the signal, and stores the identifier in an area reserved in RAM 346.

At step S730, CPU 310 compares the identifier stored in flash memory 344 with the identifier stored in RAM 346, and thereby determines whether or not there is a change in the wireless base stations. If CPU 310 determines that there is a change in the wireless base stations (YES at step S730), the processing proceeds to step S732. If not (NO at step S730), the processing is terminated and returns to the main processing. At step S732, CPU 310 stores the identifier of the wireless base station after the change in the buffer area for a standby base station.

At step S740, CPU 310 compares data each stored in area 410 and area 430, and thereby determines whether or not the identifier stored in the buffer area for a standby base station is stored in the buffer area for a base station for which assist data should be obtained. If CPU 310 determines that the identifier is stored in the buffer area for a base station for which assist data should be obtained (YES at step S740), the processing is terminated and returns to the main processing. If not (NO at step S740), the processing proceeds to step S742.

At step S742, CPU 310 stores the identifier stored in the buffer area for a standby base station (area 410), in the buffer area for a base station for which assist data should be obtained (area 430).

Referring to FIG. 8, at step S810, CPU 310 obtains an identifier (ID_A) of a wireless base station from a signal received from the wireless base station. At step S820, CPU 310 reads an identifier (ID_B) stored in the buffer area for which assist data should be obtained (area 430), and stores the identifier in a working area in RAM 346. At step S830, CPU 310 determines whether or not the two identifiers (ID_A and ID_B) are identical. If CPU 310 determines that these identifiers are identical (YES at step S830), the processing proceeds to step S840. If not (NO at step S830), the processing is terminated and returns to the main processing.

At step S840, CPU 310 generates a request to transmit assist data. The transmission request includes data for identifying communication terminal 100, the identifier of the wireless base station with which communication terminal 100 is in communication, and the like.

At step S850, CPU 310 transmits the transmission request to information providing server 1400 via communication device 304. Specifically, CPU 310 causes communication device 304 to establish a communication session with position information providing server 1400. When a communication session with position information providing server 1400 is established, CPU 310 causes communication device 304 to wirelessly transmit the transmission request. When the transmission request is received by one of wireless base stations 1100, wireless base station 1100 transmits a signal thereof to switching station 110 via communication line 102. Switching station 110 converts the communication request into a format suitable for communication with position information providing server 1400, and then transmits the converted request to position information providing server 1400. Position information providing server 1400 reads requested data in accordance with the transmission request, and returns the data to switching station 110. Switching station 110 transfers assist data to wireless base station 1100 via communication line 102.

Thereafter, at step S860, CPU 310 receives the assist data from position information providing server 1400 via communication device 304. At step S870, CPU 310 stores the assist data in flash memory 344. At step S880, CPU 310 terminates the communication with position information providing server 1400.

Figure 9:
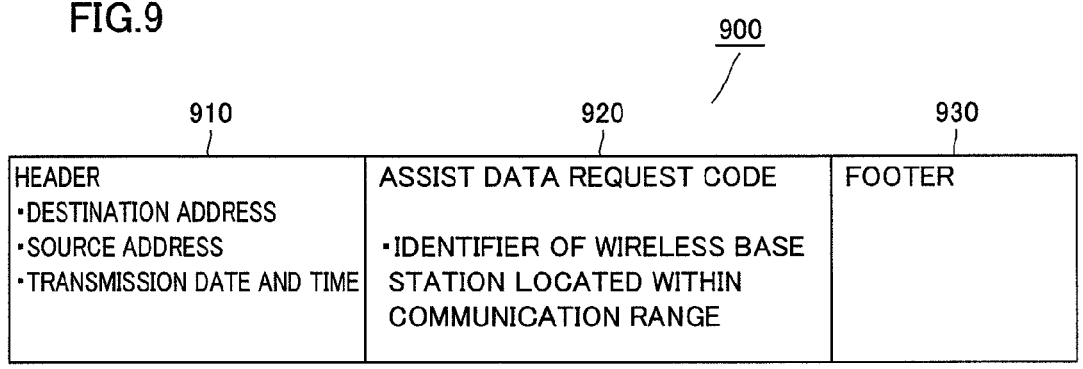
FIG. 9 is a schematic view of a configuration of a transmission request 900.

Referring to FIG. 9, the transmission request will now be described. FIG. 9 is a schematic view of a configuration of a transmission request 900. Transmission request 900 includes a header 910, an assist data request code 920, and a footer 930.

Header 910 includes a destination address (i.e., an address of position information providing server 1400 on a network), a source address (i.e., position information of communication terminal 100 on the network), and transmission date and time of transmission request 900. Assist data request code 920 includes a code representing that transmission request 900 requests transmission of assist data, and an identifier of a wireless base station located within the range in which communication terminal 100 can communicate.

When position information providing server 1400 receives transmission request 900 having such a configuration, position information providing server 1400 refers to the identifier included in assist data request code 920, reads position information of a wireless base station corresponding to the identifier from a database, and returns to communication terminal 100 a reply corresponding to a request specified by assist data request code 920.

Figure 10:
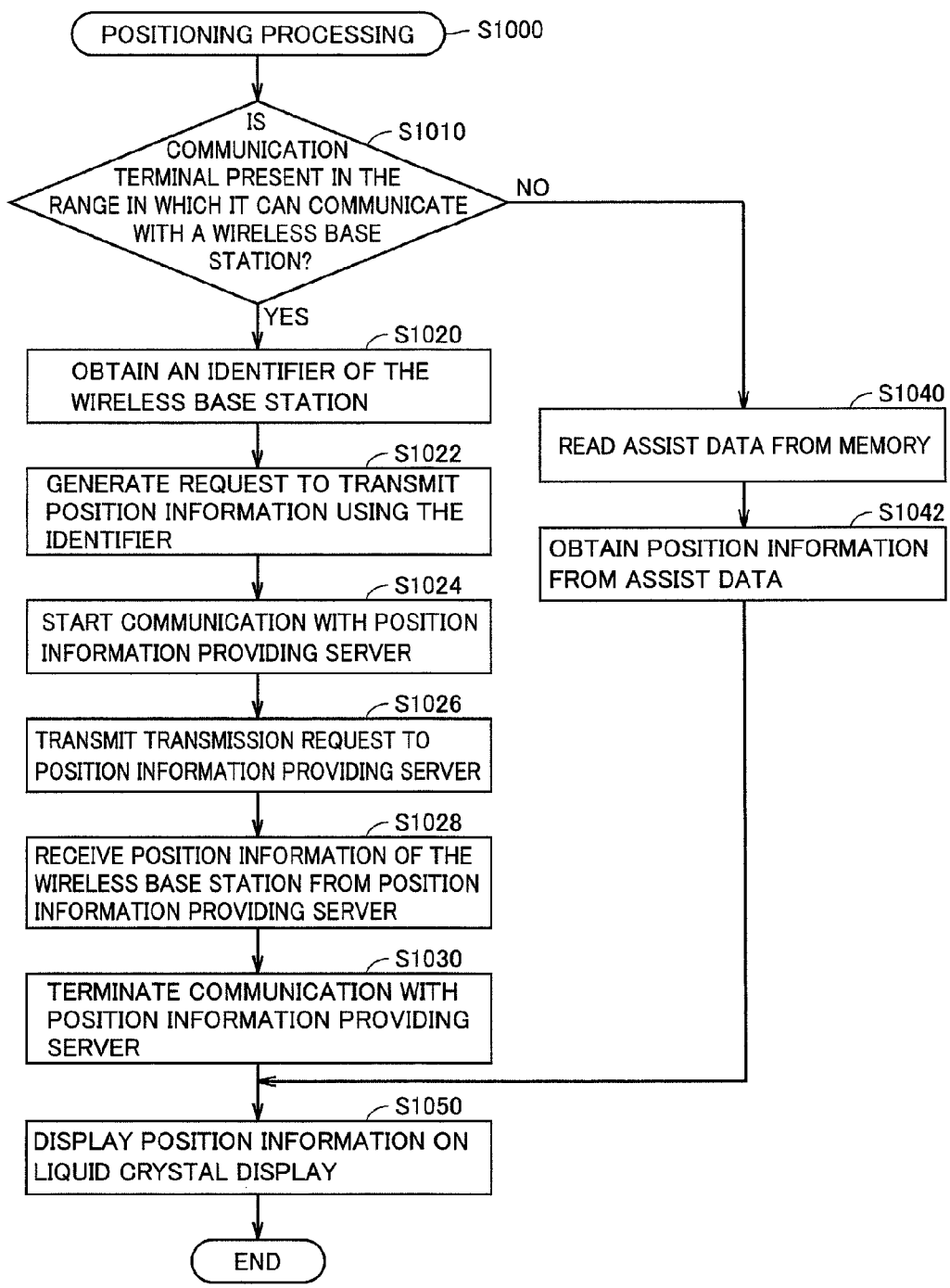
FIG. 10 is a flow chart illustrating procedures of processing performed by CPU 310 for positioning communication terminal 100.

Next, referring to FIG. 10, a control structure of communication terminal 100 will be further described. FIG. 10 is a flow chart illustrating procedures of processing performed by CPU 310 for positioning communication terminal 100.

At step S1010, CPU 310 determines whether or not communication terminal 100 is present in the range in which communication terminal 100 can communicate with a wireless base station. If CPU 310 determines that communication terminal 100 is present in the range in which communication terminal 100 can communicate with a wireless base station, (YES at step S1010), the processing proceeds to step S1020. If not (NO at step S1010), the processing proceeds to step S1040.

At step S1020, CPU 310 obtains an identifier of the wireless base station from a signal received by communication device 304. At step S1022, CPU 310 generates a request to transmit position information of the wireless base station using the identifier. At step S1024, CPU 310 starts communication with position information providing server 1400. At step S1026, CPU 310 transmits the transmission request to position information providing server 1400. At step S1028, CPU 310 receives the position information of the wireless base station from position information providing server 1400, and stores the position information in flash memory 344. At step S1030, CPU 310 terminates the communication with position information providing server 1400.

At step S1040, CPU 310 reads the assist data from flash memory 344. At step S1042, CPU 310 reads position information included in the assist data into RAM 346. At step S1050, CPU 310 displays position information of communication terminal 100 on liquid crystal display 350 based on the data stored in RAM 346.

Figure 11:
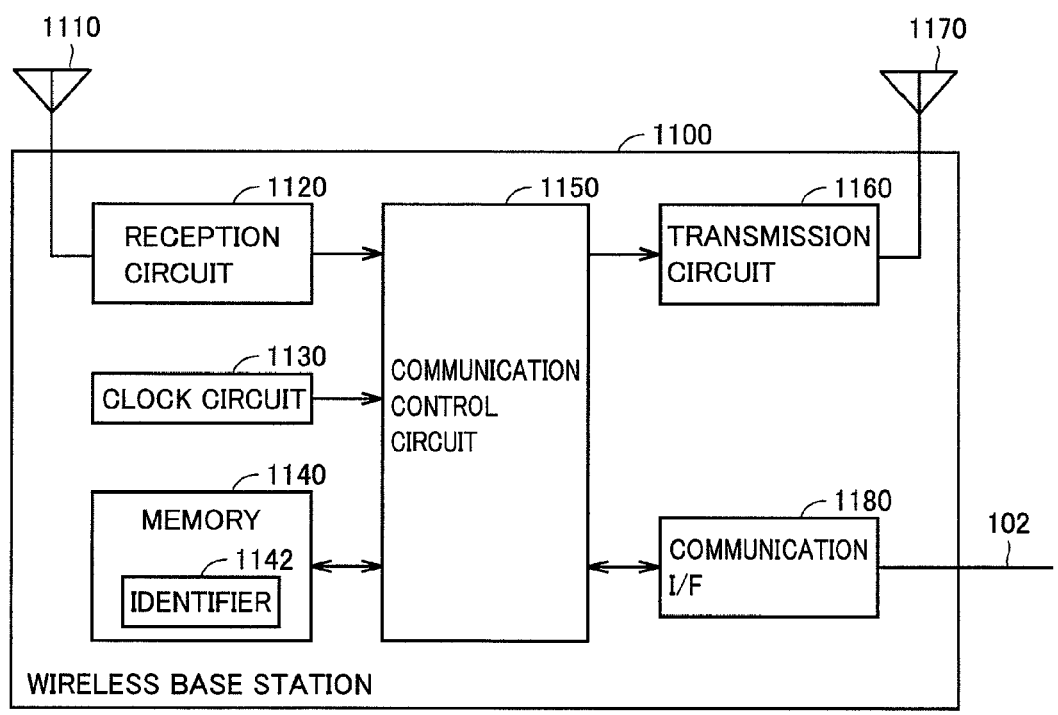
FIG. 11 is a block diagram showing a hardware configuration of a wireless base station 1100.

Referring to FIG. 11, wireless base station 1100 will be described. FIG. 11 is a block diagram showing a hardware configuration of wireless base station 1100. Wireless base station 1100 includes, as main components, antenna 1110 and 1170, a reception circuit 1120, a clock circuit 1130, a memory 1140, a communication control circuit 1150, a transmission circuit 1160, and a communication I/F 1180. Communication I/F 1180 is connected to communication line 102.

Antenna 1110 receives a radio wave transmitted by communication terminal 100. Reception circuit 1120 performs frequency conversion and other processing on a signal sent from antenna 1110, and sends the processed signal to communication control circuit 1150. Clock circuit 1130 measures time in wireless base station 1100, and sends data representing the time to communication control circuit 1150.

Memory 1140 stores data predefined to be used by wireless base station 1100. For example, memory 1140 stores an identifier 1142 specific to wireless base station 1100. The data in memory 1140 may be writable by processing by communication control circuit 1150.

Communication control circuit 1150 relays communication between communication terminal 100 and another information communication device. Communication control circuit 1150 converts the radio wave transmitted by communication terminal 100 into a signal format suitable for communication in communication line 102, and sends the converted radio wave to communication I/F 1180. Alternatively, communication control circuit 1150 converts a signal received via communication I/F 1180 into a format corresponding to wireless transmission, and sends the converted signal to transmission circuit 1160.

Transmission circuit 1160 transmits a radio wave via antenna 1170, based on the signal output from communication control circuit 1150. The radio wave to be transmitted is, for example, a radio wave including identifier 1142, and includes a signal for calling up a destination transmitted from another information communication device to communication terminal 100 for making a call.

Communication I/F 1180 implements communication between wireless base station 1100 and switching station 110. Communication I/F 1180 performs protocol conversion of a signal to be used between a signal format within wireless base station 1100 and a transmission format in communication line 102. For example, if communication of a call in communication line 102 complies with the IP (Internet Protocol), communication I/F 1180 converts a signal of a wireless phone call made by communication terminal 100 received by reception circuit 1120 to comply with the protocol, and sends the converted signal. Conversely, if communication I/F 1180 receives a call signal complying with the protocol, communication I/F 1180 converts the protocol into a protocol suitable for wireless communication with communication terminal 100.

Figure 12:
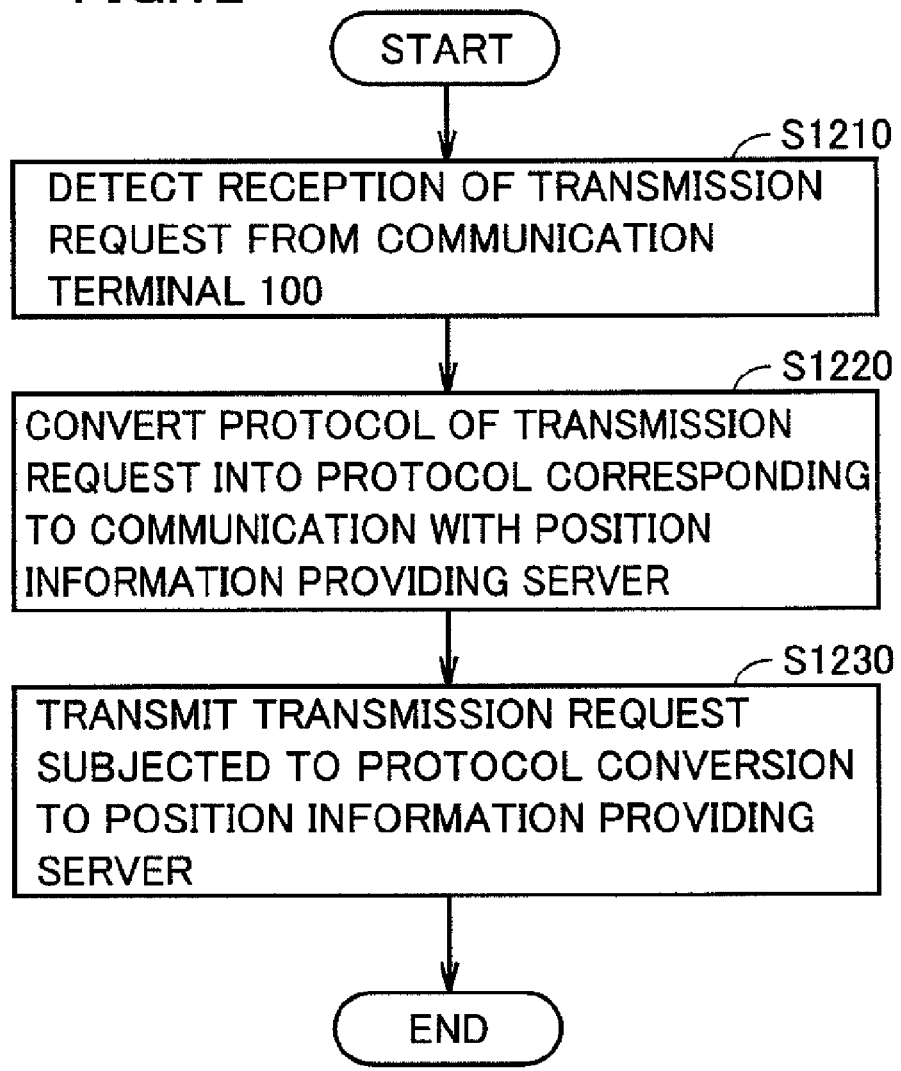
FIG. 12 is a flow chart (part 1) illustrating procedures of processing performed by a communication control circuit 1150.
Figure 13:
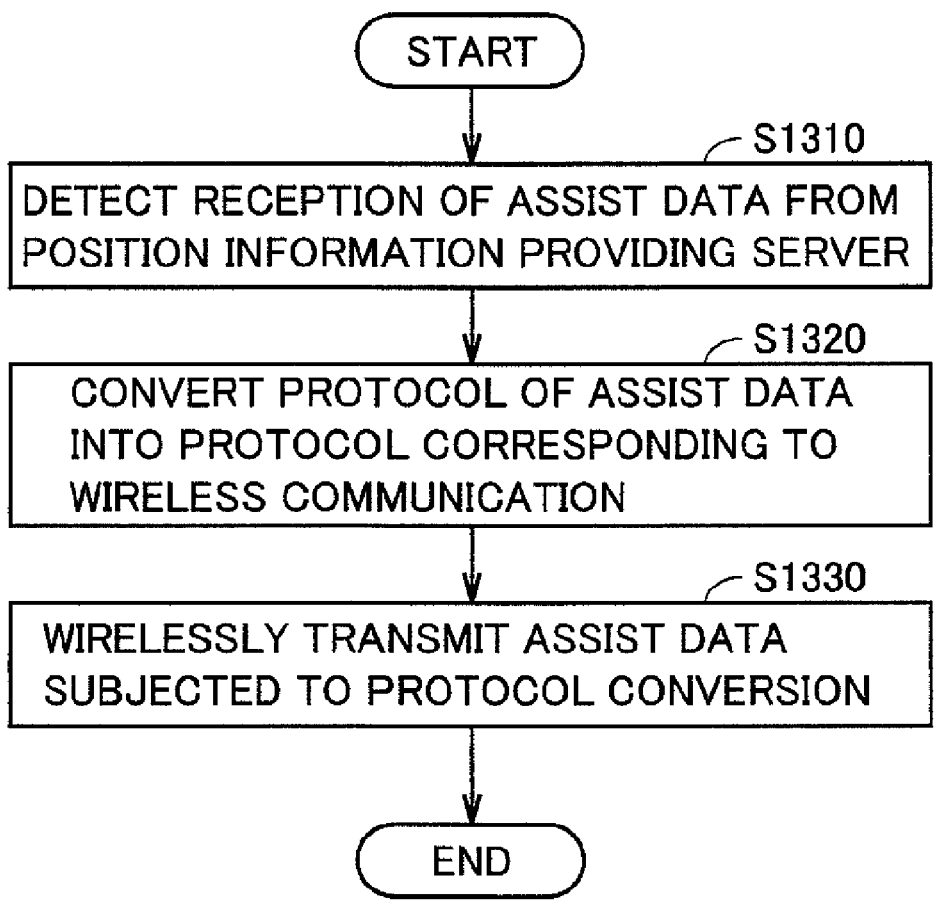
FIG. 13 is a flow chart (part 2) illustrating procedures of processing performed by communication control circuit 1150.

Referring to FIGS. 12 and 13, a control structure of wireless base station 1100 will be described. FIGS. 12 and 13 are each a flow chart illustrating procedures of processing performed by communication control circuit 1150.

Referring to FIG. 12, at step S1210, communication control circuit 1150 of wireless base station 1100 detects reception of a request to transmit assist data from communication terminal 100 based on an output from reception circuit 1120.

At step S1220, communication control circuit 1150 converts a protocol of the transmission request into a protocol corresponding to communication with position information providing server 1400. At step S1230, communication control circuit 1150 transmits to position information providing server 1400 the transmission request subjected to protocol conversion, via communication I/F 1180.

Referring to FIG. 13, at step S1310, communication control circuit 1150 of wireless base station 1100 detects reception of the assist data from position information providing server 1400 via communication I/F 1180. At step S1320, communication control circuit 1150 converts a protocol of the assist data into a protocol corresponding to wireless communication. At step S1330, communication control circuit 1150 wirelessly transmits the assist data subjected to protocol conversion, via transmission circuit 1160 and antenna 1170. As a result, a radio wave including the assist data is transmitted within a cover range of the wireless base station. If communication terminal 100 is present within the range, communication terminal 100 can receive the assist data.

Figure 14:
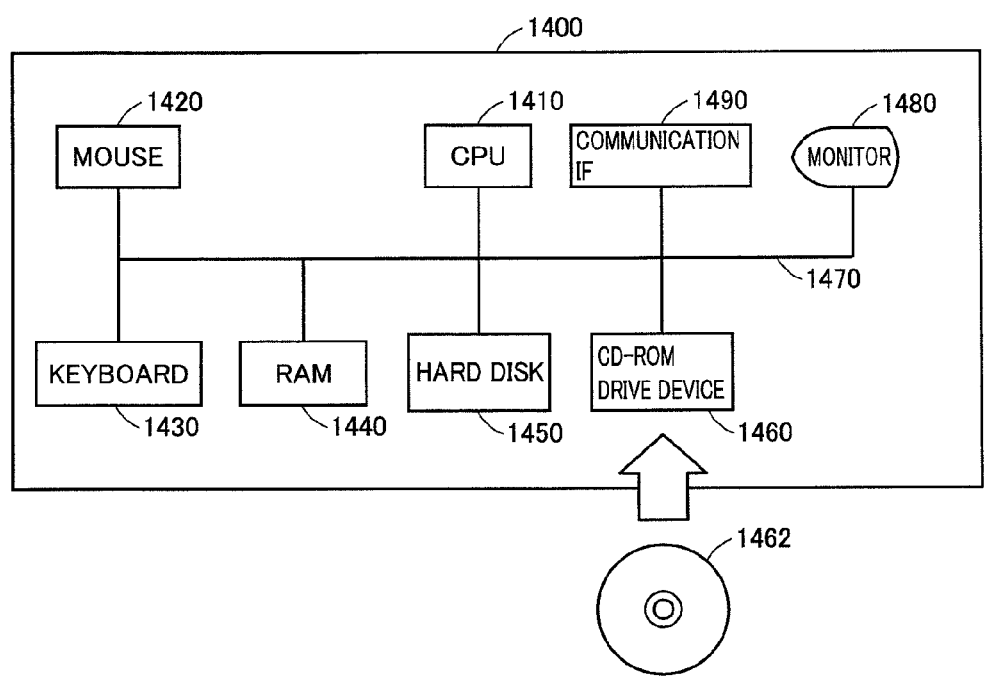
FIG. 14 is a block diagram showing a hardware configuration of a position information providing server 1400.

Referring to FIG. 14, a concrete configuration of position information providing server 1400 in accordance with the present embodiment will now be described. FIG. 14 is a block diagram showing a hardware configuration of position information providing server 1400. Position information providing server 1400 is implemented, for example, by a well-known computer system.

Position information providing server 1400 includes, as main components, a CPU 1410, a mouse 1420 and a keyboard 1430 accepting an input of an instruction by a user, a RAM 1440 temporarily storing data generated by the execution of a program by CPU 1410 or data input via mouse 1420 or keyboard 1430, a hard disk 1450 storing data or a program in a nonvolatile manner, a CD-ROM (Compact Disk Read Only Memory) drive device 1460, a monitor 1480, and a communication I/F 1490. The components are mutually connected by a data bus 1470. A CD-ROM 1462 is loaded in CD-ROM drive device 1460.

Processing in position information providing server 1400 is implemented by each component and software executed by CPU 1410. Such software may be stored beforehand in hard disk 1450. The software may also be stored in CD-ROM 1462 or another recording medium and distributed as a program product. Alternatively, the software may also be provided as a downloadable program product by an information provider operating a server connected to the so-called Internet. Such software is read from the recording medium by CD-ROM drive device 1460 or another data reading device, or downloaded via communication I/F 1490, and thereafter once stored in hard disk 1450. The software is read from hard disk 1450 into RAM 1440 by CPU 1410, and stored in a format of an executable program. CPU 1410 executes the program stored in RAM 1440.

The components constituting position information providing server 1400 shown in FIG. 14 are common ones. Therefore, it can be said that the essential part of position information providing server 1400 is the software stored in RAM 1440, hard disk 1450, CD-ROM 1462, or another recording medium, or the software downloadable via the network. Since operations of hardware of a computer system implementing position information providing server 1400 are well known, a detailed description thereof will not be repeated herein.

It is to be noted that the recording medium is not limited to CD-ROM 1462 and hard disk 1450, and may be a medium carrying a program in a semiconductor memory or the like in a fixed manner, such as a magnetic tape, a cassette tape, an optical disc (MO (Magnetic Optical Disc), MD (Mini Disc), DVD (Digital Versatile Disc)), an IC (Integrated Circuit) card (including a memory card), an optical card, a mask ROM, an EPROM (Erasable Programmable Read-Only Memory), an EEPROM (Electronically-EPROM), a flash ROM, and the like. Further, the program referred to herein is not limited to a program directly executable by CPU 1410, and includes a program in a source program format, a compressed program, an encrypted program, and the like.

Figure 15:
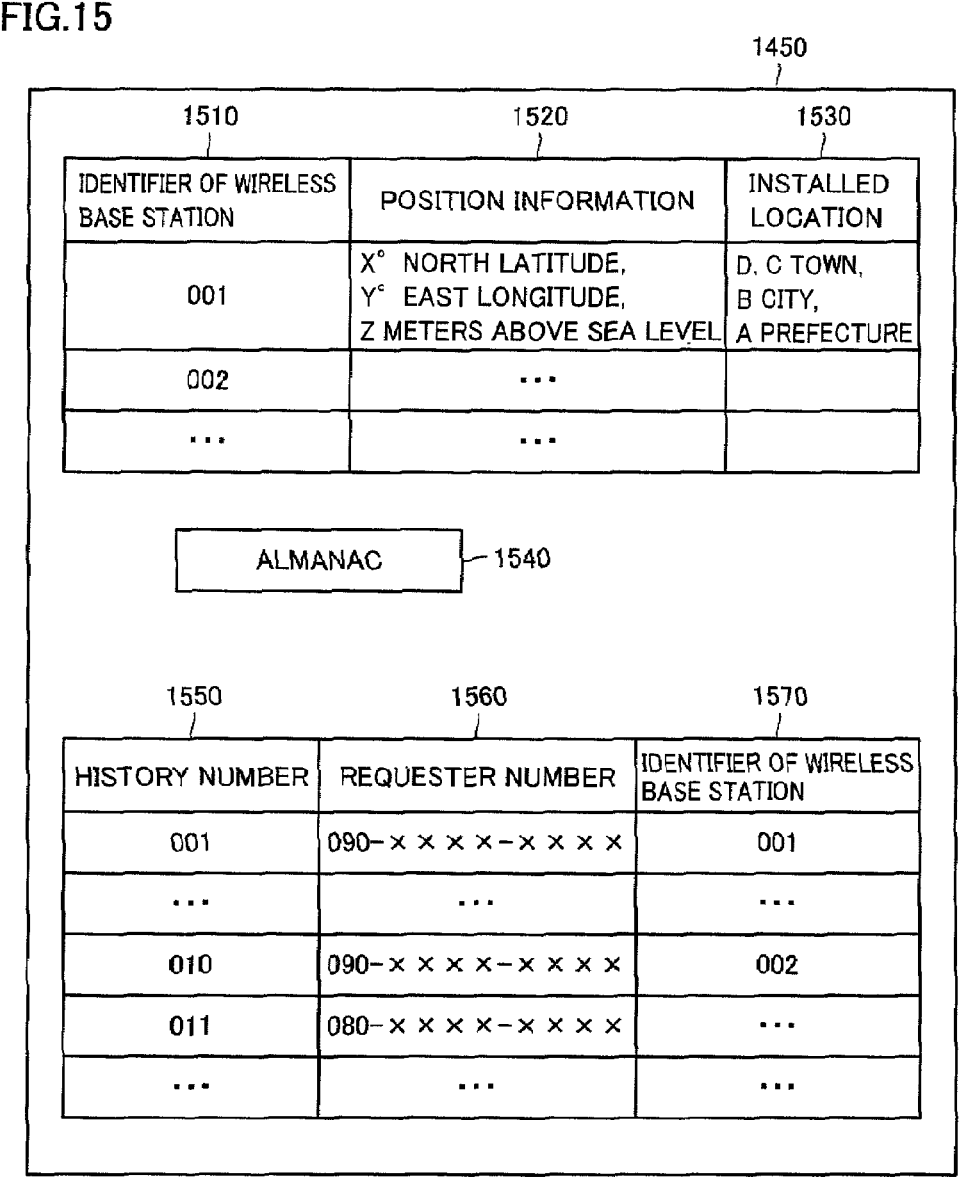
FIG. 15 is a view conceptually showing one manner of storing data in a hard disk 1450.

Referring to FIG. 15, a data configuration of position information providing server 1400 will now be described. FIG. 15 is a view conceptually showing one manner of storing data in hard disk 1450. Hard disk 1450 includes areas 1510 to 1570 for storing data.

Data for identifying a wireless base station (i.e., identifier) is stored in area 1510. Position information for specifying a location where the wireless base station is placed is stored in area 1520. Data indicating the name of a place where the wireless base station is placed is stored in area 1530. Information indicating an overview of orbits of the GPS satellites (i.e., so-called "almanac") is stored in area 1540. Transmission histories of the position information stored in area 1520 are stored in areas 1550 to 1570. Specifically, a history number for specifying each of the transmission histories is stored in area 1550. A transmission destination (i.e., data identifying communication terminal 100) is stored in area 1560. This data corresponds to the phone number of communication terminal 100 operating, for example, as a mobile phone. Data identifying the wireless base station corresponding to the transmitted assist data is stored in area 1570. For example, with reference to history number "001", it is shown that position information of a wireless base station (001) (in area 1520) has been sent to a requester of the assist data (i.e., a requester number "090-xxxx-xxxx"). Herein, the position information of wireless base station "001" (in area 1520) is "X° north latitude, Y° east longitude, Z meters above sea level). Further, the wireless base station is placed at No. D, C town, B city, A prefecture. The transmission histories are sequentially stored in hard disk 1450.

Figure 16:
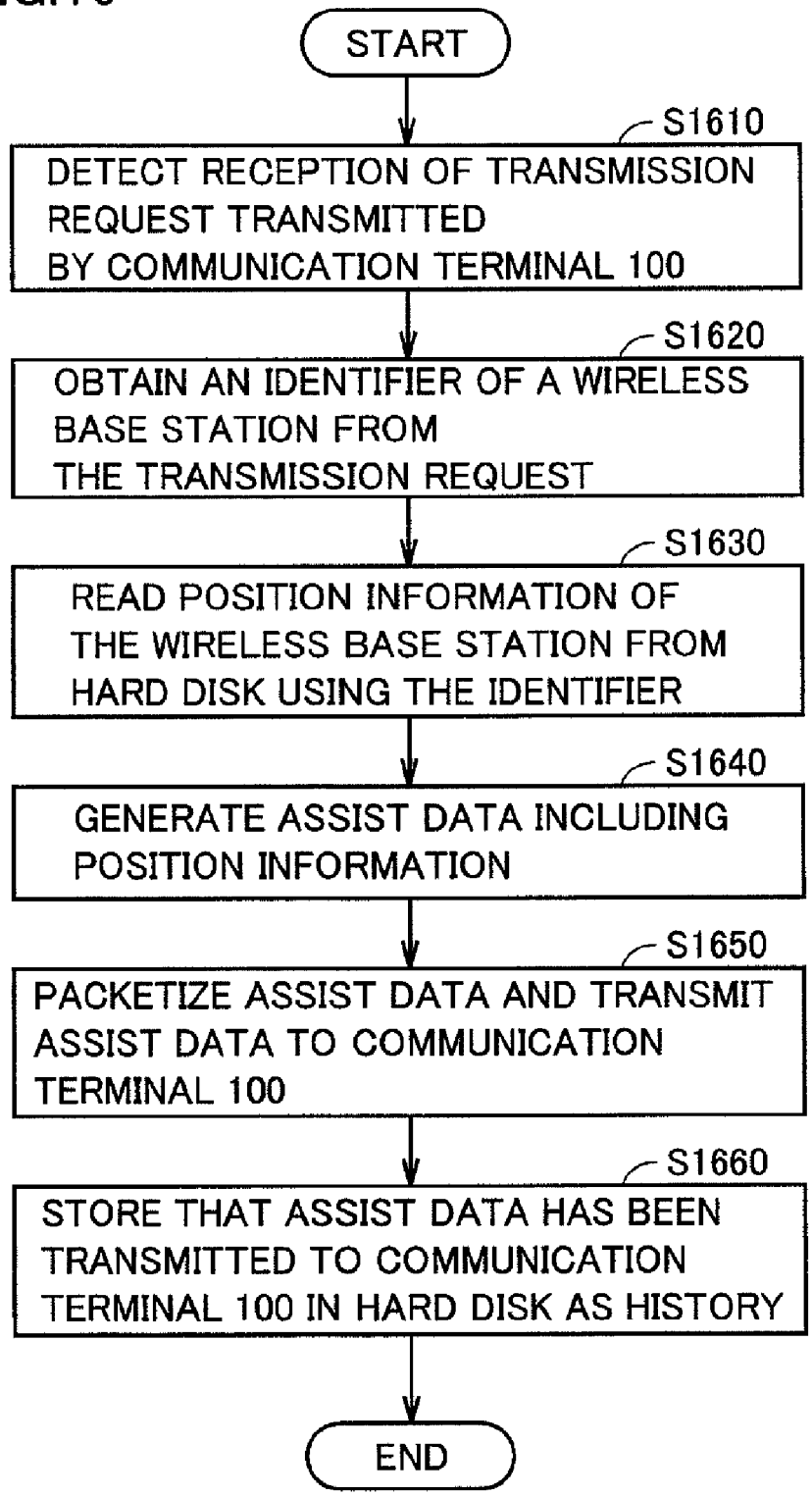
FIG. 16 is a flow chart illustrating procedures of processing performed by a CPU 1410 of position information providing server 1400.

Referring to FIG. 16, a control structure of position information providing server 1400 will be described. FIG. 16 is a flow chart illustrating procedures of processing performed by CPU 1410.

At step S1610, CPU 1410 detects reception of a transmission request transmitted by communication terminal 100 based on data input via communication I/F 1490. At step S1620, CPU 1410 stores the transmission request in RAM 1440, and obtains an identifier of a wireless base station from the transmission request. At step S1630, CPU 1410 accesses hard disk 1450 using the identifier, and reads position information of the wireless base station (in area 1520).

At step S1640, CPU 1410 generates assist data including the read position information. At step S1650, CPU 1410 packetizes the assist data, and transmits the assist data to communication terminal 100 via communication I/F 1490. At step S1660, CPU 1410 stores in hard disk 1450 that the assist data has been transmitted to communication terminal 100, as transmission histories (in areas 1550 to 1570).

Figure 17:
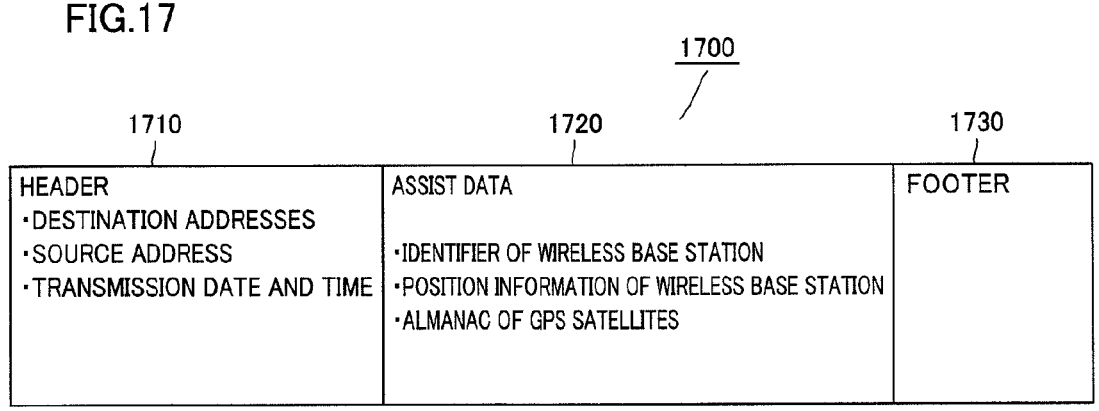
FIG. 17 is a view showing a schematic configuration of a signal 1700 to be transmitted from position information providing server 1400 to communication terminal 100.

Referring to FIG. 17, a signal 1700 to be transmitted from position information providing server 1400 to communication terminal 100 will now be described. FIG. 17 is a view showing a schematic configuration of signal 1700. Signal 1700 includes a header 1710, assist data 1720, and a footer 1730. Header 1710 includes destination addresses (i.e., an identifier of a wireless base station and identification information of communication terminal 100), a source address (i.e., an address of position information providing server 1400 on the network), and transmission date and time of signal 1700. Assist data 1720 includes the identifier of the wireless base station, position information of the wireless base station (in area 1520), and the almanac of the GPS satellites (in area 1540).

Figure 18:
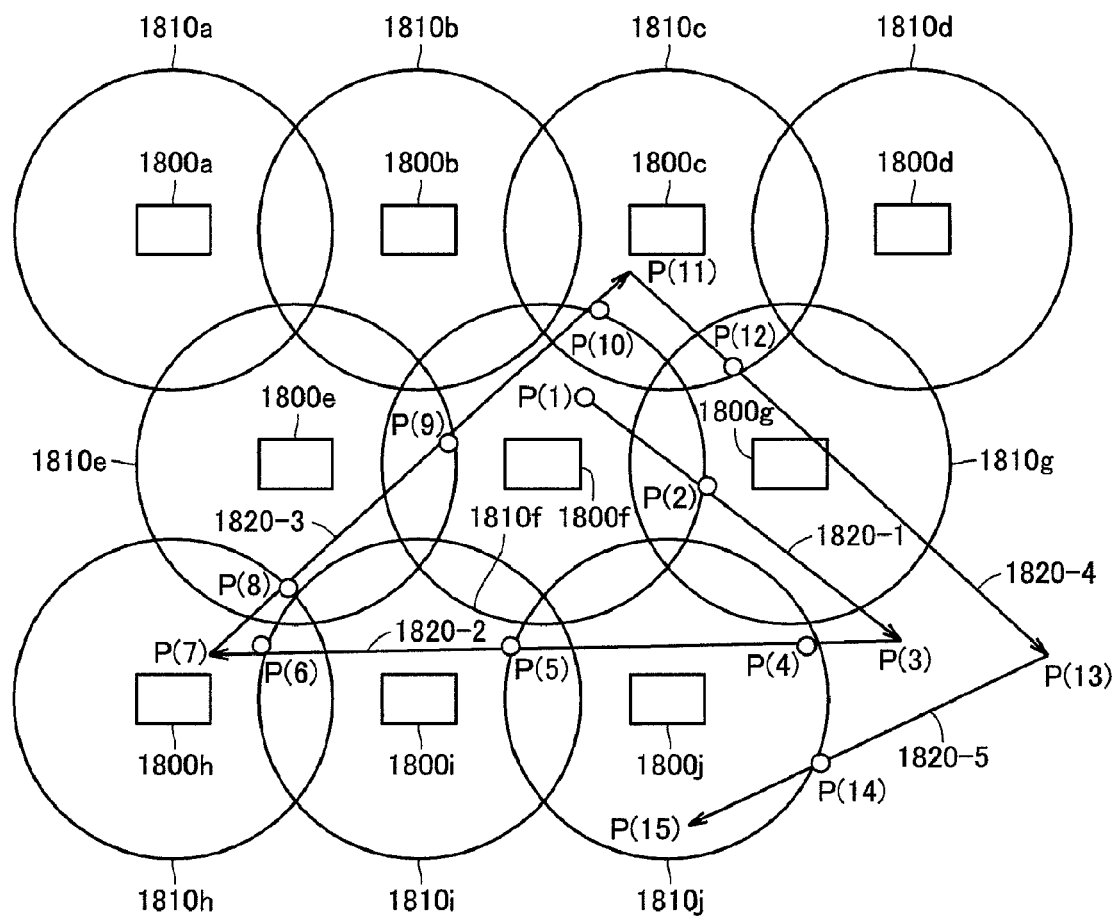
FIG. 18 is a view showing a path along which communication terminal 100 moves in a plurality of wireless base stations and ranges covered by each wireless base station.

Referring to FIG. 18, an operation of communication terminal 100 in accordance with the present embodiment will be described. FIG. 18 is a view showing a path along which communication terminal 100 moves in a plurality of wireless base stations and ranges covered by the respective wireless base stations. A plurality of wireless base stations 1800*a* to 1800*j* are each placed to implement wireless communication by the communication terminal. The ranges in which communication is covered by the respective wireless base stations are formed, for example, such that cover ranges 1810*a* to 1810*j* adjacent to each other have an overlapping portion therebetween.

Hereinafter, a case where communication terminal 100 is present at a point P(1) in cover range 1810*f* covered by wireless base station 1800*f* will be described. When communication terminal 100 is present at point P(1) and power is turned on, communication terminal 100 is in a state in which it can receive a radio wave transmitted by wireless base station 1800*f*. As communication terminal 100 moves to a point P(3) through a path 1820-1, the range covered by the wireless base station is switched, at a point P(2) on the path, from cover range 1810*f* to cover range 1810*g*. Communication terminal 100 obtains an identifier of wireless base station 1800*g* from a signal received via communication device 304, and stores the identifier of wireless base station 1800*g* in area 410 of flash memory 344 (step S732).

Thereafter, when communication terminal 100 moves to point P(3), that is, moves beyond the ranges in which communication with the respective wireless base stations can be established, CPU 310 stores the identifier of the wireless base station stored in area 410, in area 430 serving as the buffer area for a base station for which assist data should be obtained (step S742).

Further, as communication terminal 100 moves from point P(3) to a point P(7) along a route determined by a path 1820-2, communication terminal 100 passes through points P(4), P(5), and P(6) each serving as a point at which a range in which a radio wave from a wireless base station can be received is switched to another range. Specifically, at point P(4), CPU 310 obtains an identifier of wireless base station 1800*j* from a radio wave transmitted by the wireless base station, and stores the identifier to each of area 410 (the buffer area for a stand-by base station) and area 430 (the buffer area for a base station for which assist data should be obtained) (step S716). As a result, in area 430, the identifier of wireless base station 1800*g* and the identifier of wireless base station 1800*j* are each stored. When communication terminal 100 moves from point P(4) to point P(5) following path 1820-2, this movement occurs within a range in which a radio wave from any one of the wireless base stations can be received, and thus communication terminal 100 can receive a radio wave transmitted by wireless base station 1800*i* at point P(5). CPU 310 obtains an identifier of wireless base station 1800*i* from the radio wave, and stores the identifier in area 410 (step S732).

When communication terminal 100 further moves following path 1820-2 and reaches point P(6), communication terminal 100 receives a radio wave transmitted by wireless base station 1800*h*. CPU 310 detects a change in the wireless base stations (YES at step S730), and stores an identifier of wireless base station 1800*h* in area 410 (step S732).

Thereafter, while moving from a point P(7) to a point P(11) (i.e., along a path 1820-3), communication terminal 100 also sequentially obtains identifiers of the wireless base stations and stores the identifiers in area 410. As communication terminal 100 moves from point P(11) to a point P(13) (along a path 1820-4), CPU 310 detects reception of a radio wave transmitted by wireless base station 1800*g* at a point P(12). Since the identifier of wireless base station 1800*g* is already stored in the buffer area for a base station for which assist data should be obtained (area 430), CPU 310 functions as assist data obtaining unit 550 and thereby requests position information providing server 1400 to transmit assist data. As a result, communication terminal 100 can obtain position information associated with wireless base station 1800*g* beforehand while it is present in range 1810*g* in which a call is covered by wireless base station 1800*g*. Thereafter, when the user of communication terminal 100 inputs an instruction for positioning (YES at step 620), communication terminal 100 performs positioning processing based on the obtained assist data (step S1000).

While communication terminal 100 is present at point P(13) located in a range in which no radio wave can be received from any of the wireless base stations, communication terminal 100 cannot perform positioning processing other than positioning using the signals received from GPS satellites 130. Then, as communication terminal 100 moves from point P(13) to a point P(15) (along a path 1820-5), communication terminal 100 can receive the radio wave transmitted by wireless base station 1800*j* at a point P(14). Since the identifier of wireless base station 1800*j* is already obtained and stored in the buffer area for a base station for which assist data should be obtained (area 430, at point P(4)), CPU 310 functions as assist data obtaining unit 550 and thereby obtains from position information providing server 1400 position information associated with wireless base station 1800*j*. CPU 310 associates the obtained assist data with the identifier of the wireless base station and obtained date and time, and stores them in areas 450 to 470.

As a result, while communication terminal 100 is present in range 1810*j* covered by wireless base station 1800*j*, even if communication terminal 100 cannot receive the signals from GPS satellites 130 and thus positioning cannot be performed, the position of communication terminal 100 can be specified by referring to the position information stored in area 460. It is to be noted that, while communication terminal 100 is present in cover range 1810*j* for a long time, CPU 310 may periodically obtain assist data. For example, CPU 310 may periodically perform processing for obtaining assist data at predetermined time intervals by referring to time data stored in an area 480. With this manner, a plurality of position information can be stored when communication terminal 100 is present in the ranges in which it can communicate with the wireless base stations, and thus the position of communication terminal 100 can be specified precisely.

As have been described above, communication terminal 100 in accordance with the present embodiment can obtain assist data for obtaining position information in accordance with a result of reception of a radio wave from a wireless base station. Therefore, since position information providing server 1400 providing the assist data does not have to determine, on its own, the timing of transmitting the assist data to communication terminal 100, a configuration of position information providing server 1400 can be prevented from being made complicated.

Further, since communication terminal 100 can obtain assist data while it is present in the ranges covered by the respective wireless base stations, the position of communication terminal 100 can be displayed even when communication terminal 100 cannot receive the signals from the GPS satellites.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

INDUSTRIAL APPLICABILITY

The present invention is applicable to a communication terminal having a positioning function, for example, a mobile phone, a GPS terminal, or the like.

The invention claimed is:

1. A communication terminal capable of wirelessly communicating with each of a plurality of base stations, said each base station being connected to an information providing device via a communication line, said information providing device being capable of transmitting assist data for assisting to specify a position of said communication terminal in response to a request, said each base station being capable of transmitting a radio wave including identification information for identifying itself and a radio wave including said assist data, said communication terminal comprising:
a first receiver configured to receive said each radio wave transmitted by said each base station;
a processor; and
a memory connected to said processor, wherein
said processor is configured to obtain said identification information from said radio wave;
said memory is configured to store said obtained identification information;
said processor is configured to obtain said assist data from said information providing device when said communication terminal is present in a range in which said communication terminal can communicate with the base station specified by said identification information;
said communication terminal further comprising:
a second receiver configured to receive a plurality of positioning signals for positioning, wherein
said processor is configured to calculate position information indicating the position of said communication terminal based on said assist data or said plurality of positioning signals,
said communication terminal further comprising:
an output device configured to output said calculated position information,
wherein said processor compares newly obtained said identification information with said identification information already stored in said memory, and thereby determines whether or not said communication terminal is present in said range,
generates a transmission request for said assist data when it is determined that said communication terminal is present in said range,
transmits said generated transmission request to said information providing device, and
extracts said assist data from a signal received by said first receiver, and
wherein, when said communication terminal moves from a first range in which said communication terminal cannot receive the radio waves transmitted by said base stations to a second range in which said communication terminal can receive the radio waves, said processor is configured to obtain said identification information from the radio waves received in said second range, and
when said communication terminal moves to said first range after said identification information is obtained, and then moves from said first range to be present again in said second range in which said communication terminal can receive the radio wave from the base station specified by said identification information, said processor is configured to obtain said assist data based on said identification information.

2. The communication terminal according to claim 1, wherein
said memory sequentially stores, of the obtained identification information, the identification information different from the already stored identification information,
said processor is further configured to:
detect that said communication terminal has moved from a range in which said communication terminal cannot receive the radio waves transmitted by said base stations to a range in which said communication terminal can communicate with the base station specified by the identification information most recently stored in said memory, based on an output from said first receiver; and
obtain said assist data when said communication terminal is present again in the range in which said communication terminal can communicate with the base station specified by said most recently stored identification information.

3. The communication terminal according to claim 1, further comprising a clock,
wherein said processor is configured to obtain said assist data at predetermined time intervals.

4. The communication terminal according to claim 1, further comprising an input device configured to accept a manipulation for said communication terminal,
wherein said processor is configured to obtain said identification information based on an input of a manipulation predefined as a manipulation for obtaining said identification information.

5. The communication terminal according to claim 1, wherein said processor is further configured to:
confirm whether or not said each positioning signal has been received by said second receiver based on an output from said second receiver, and
calculate said position information based on said assist data, when it is confirmed that said each positioning signal has not been received.

6. The communication terminal according to claim 1, wherein said processor is further configured to:
confirm whether or not said each positioning signal has been received by said second receiver based on an output from said second receiver, and
calculate said position information based on said each positioning signal received, when it is confirmed that said each positioning signal has been received.

7. The communication terminal according to claim 1, wherein said assist data includes information specifying a location where said base station is placed.

8. The communication terminal according to claim 1, wherein said identification information includes an identifier specific to said base station.

9. A method for allowing a communication terminal to obtain position information, said communication terminal being capable of wirelessly communicating with each of a plurality of base stations, said each base station being connected to an information providing device via a communication line, said information providing device being capable of transmitting assist data for assisting to specify a position of said communication terminal in response to a request, said each base station being capable of transmitting a radio wave including identification information for identifying itself and a radio wave including said assist data, the method comprising:
- receiving each radio wave transmitted by said each base station;
- obtaining said identification information from said radio wave;
- storing said obtained identification information;
- obtaining said assist data from said information providing device when said communication terminal is present in a range in which said communication terminal can communicate with the base station specified by said identification information;
- receiving a plurality of positioning signals for positioning;
- calculating position information indicating the position of said communication terminal based on said assist data or said plurality of positioning signals; and
- outputting said calculated position information,
- wherein said obtaining said assist data includes:
  - comparing said identification information newly obtained with said identification information already stored, and thereby determining whether or not said communication terminal is present in said range,
  - generating a transmission request for said assist data when it is determined that said communication terminal is present in said range,
  - transmitting said generated transmission request to said information providing device, and
  - extracting said assist data from said received signal,
- said obtaining said identification information includes the step of obtaining, when said communication terminal moves from a first range in which said communication terminal cannot receive the radio waves transmitted by said base stations to a second range in which said communication terminal can receive the radio waves, said identification information from the radio waves received in said second range, and
- said obtaining said assist data includes obtaining said assist data based on said identification information when said communication terminal moves to said first range after said identification information is obtained, and then moves from said first range to be present again in said second range in which said communication terminal can receive the radio wave from the base station specified by said identification information.

10. The method according to claim 9, wherein
said storing the identification information includes sequentially storing, of said obtained identification information, the identification information different from the already stored identification information,
said method further comprises detecting that said communication terminal has moved from a range in which said communication terminal cannot receive the radio waves transmitted by said base stations to a range in which said communication terminal can communicate with the base station specified by the identification information most recently stored; and
said obtaining said assist data includes obtaining said assist data when said communication terminal is present again in the range in which said communication terminal can communicate with the base station specified by said most recently stored identification information.

11. The method according to claim 9, further comprising keeping time,
wherein said obtaining said assist data includes obtaining said assist data at predetermined time intervals.

12. The method according to claim 9, further comprising accepting a manipulation for said communication terminal,
wherein said obtaining said identification information includes obtaining said identification information based on an input of a manipulation predefined as a manipulation for obtaining said identification information.

13. The method according to claim 9, further comprising confirming whether or not said each positioning signal has been received,
wherein said calculating said position information includes calculating said position information based on said assist data when it is confirmed that said each positioning signal has not been received.

14. The method according to claim 9, further comprising confirming whether or not said each positioning signal has been received,
wherein said calculating said position information includes calculating said position information based on said each positioning signal received, when it is confirmed that said each positioning signal has been received.

15. A non-transitory computer readable medium for controlling a communication terminal, said communication terminal being capable of wirelessly communicating with each of a plurality of base stations, said each base station being connected to an information providing device via a communication line, said information providing device being capable of transmitting assist data for assisting to specify a position of said communication terminal in response to a request, said each base station being capable of transmitting a radio wave including identification information for identifying itself and a radio wave including said assist data, said program causing said communication terminal to perform:
- receiving said each radio wave transmitted by said each base station;
- obtaining said identification information from said radio wave;
- saving said obtained identification information;
- obtaining said assist data from said information providing device when said communication terminal is present in a range in which said communication terminal can communicate with the base station specified by said identification information;
- receiving a plurality of positioning signals for positioning;
- obtaining position information indicating the position of said communication terminal based on said assist data or said plurality of positioning signals; and
- outputting said obtained position information
- wherein said obtaining said assist data includes:
  - comparing said identification information newly obtained with said identification information already stored, and thereby determining whether or not said communication terminal is present in said range,
  - generating a transmission request for said assist data when it is determined that said communication terminal is present in said range,
  - transmitting said generated transmission request to said information providing device, and
  - extracting said assist data from said received signal,
- said obtaining said identification information includes obtaining, when said communication terminal moves from a first range in which said communication terminal cannot receive the radio waves transmitted by said base stations to a second range in which said communication terminal can receive the radio waves, said identification information from the radio waves received in said second range, and said obtaining said assist data includes obtaining said assist data based on said identification information when said communication terminal moves to said first range after said identification information is obtained, and then moves from said first range to be present again in said second range in which said communication terminal can receive the radio wave from the base station specified by said identification information.

16. The non-transitory computer readable medium according to claim 15, wherein said storing the identification information includes sequentially storing, of said obtained identification information, the identification information different from the already stored identification information, said program further comprises detecting that said communication terminal has moved from a range in which said communication terminal cannot receive the radio waves transmitted by said base stations to a range in which said communication terminal can communicate with the base station specified by the identification information most recently stored; and said obtaining said assist data includes obtaining said assist data when said communication terminal is present again in the range in which said communication terminal can communicate with the base station specified by said most recently stored identification information.

17. The non-transitory computer readable medium according to claim 15, said program further causing said communication terminal to perform keeping time, wherein said obtaining said assist data includes obtaining said assist data at predetermined time intervals.

18. The non-transitory computer readable medium according to claim 15, said program further causing said communication terminal to perform accepting a manipulation for said communication terminal, wherein said obtaining said identification information includes obtaining said identification information based on an input of a manipulation predefined as a manipulation for obtaining said identification information.

19. The non-transitory computer readable medium according to claim 15, said program further causing said communication terminal to perform confirming whether or not said each positioning signal has been received, wherein said calculating said position information includes calculating said position information based on said assist data when it is confirmed that said each positioning signal has not been received.

20. The non-transitory computer readable medium according to claim 15, said program further causing said communication terminal to perform confirming whether or not said each positioning signal has been received, wherein said calculating said position information includes calculating said position information based on said each positioning signal received, when it is confirmed that said each positioning signal has been received.

* * * * *